(12) United States Patent
Venkatachalam et al.

(10) Patent No.: US 7,518,544 B2
(45) Date of Patent: Apr. 14, 2009

(54) RETRIEVAL OF PARAMETERS IN NETWORKED RADAR ENVIRONMENTS

(75) Inventors: Chandrasekaran Venkatachalam, Fort Collins, CO (US); Sang Hun Lim, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 101 days.

(21) Appl. No.: 11/457,335

(22) Filed: Jul. 13, 2006

(65) Prior Publication Data
US 2008/0012755 A1    Jan. 17, 2008

(51) Int. Cl.
*G01S 7/28* (2006.01)
*G01S 7/02* (2006.01)
*G01S 13/00* (2006.01)
*G01S 13/95* (2006.01)

(52) U.S. Cl. .................. 342/59; 342/26 R; 342/89; 342/165; 342/173; 342/175; 342/195

(58) Field of Classification Search ...... 342/26 R–26 D, 342/59, 175, 89–103, 190–197, 159–174
See application file for complete search history.

(56) References Cited

U.S. PATENT DOCUMENTS

| | | | | |
|---|---|---|---|---|
| 3,525,095 A | * | 8/1970 | Cordry | 342/26 B |
| 4,347,618 A | * | 8/1982 | Kavouras et al. | 342/26 D |
| 5,047,775 A | * | 9/1991 | Alitz | 342/26 D |
| 5,196,854 A | | 3/1993 | Matthews | |
| 5,221,924 A | * | 6/1993 | Wilson, Jr. | 342/26 D |
| 5,410,314 A | * | 4/1995 | Frush et al. | 342/26 D |
| 5,434,570 A | * | 7/1995 | Wurman | 342/26 D |
| 5,469,169 A | * | 11/1995 | Frush | 342/26 D |
| 5,471,211 A | * | 11/1995 | Randall et al. | 342/26 D |
| 5,583,972 A | * | 12/1996 | Miller | 342/59 |
| 5,623,267 A | * | 4/1997 | Wurman | 342/26 D |
| 5,757,322 A | * | 5/1998 | Ray et al. | 342/26 D |
| 6,803,875 B1 | | 10/2004 | Alford et al. | |
| 6,859,163 B2 | | 2/2005 | Alford et al. | |
| 6,977,608 B1 | * | 12/2005 | Anderson et al. | 342/26 B |
| 2002/0014985 A1 | * | 2/2002 | Wurman et al. | 342/26 |
| 2003/0030582 A1 | | 2/2003 | Vickers | |
| 2004/0056791 A1 | | 3/2004 | Alford et al. | |

(Continued)

FOREIGN PATENT DOCUMENTS

EP    0 613022 B1    9/1998

(Continued)

OTHER PUBLICATIONS

B. McNoldy, "Radar Meteorology Tutorial"; MESO (Multi-community Environmental Storm Observatory) on the Internet at mcwar.org; no location given; Nov. 2003.*

(Continued)

*Primary Examiner*—Bernarr E Gregory
(74) *Attorney, Agent, or Firm*—Townsend & Townsend & Crew LLP

(57) ABSTRACT

Radar beams are generated with radars disposed at different positions within an environment that attenuates at least a portion of one of the radar beams. A measured reflectivity of the environment is determined along a path of each of the radar beams. An intrinsic reflectivity is determined from different volume elements within the environment from the measured reflectivity.

32 Claims, 19 Drawing Sheets

U.S. PATENT DOCUMENTS

2005/0093734 A1      5/2005    Alford et al.

FOREIGN PATENT DOCUMENTS

| EP | 0 731922 B1 | 10/2000 |
|---|---|---|
| WO | WO 03/014673 A2 | 2/2003 |
| WO | WO 2004-086075 A2 | 10/2004 |
| WO | WO 2005-003806 A2 | 1/2005 |

OTHER PUBLICATIONS

R.C. Whiton et al., "History of Operational Use of Weather Radar by U.S. Weather Services"; in the book "Weather and Forecasting"; vol. 13, pp. 219-243; American Meteorological Society; no location given; no date given; copyright in year 1998.*

"NOAA's National Weather Service Radar Operations Center" webpage at noaa.gov; no author name listed; no date listed.*

Chandrasekar, V., "Estimation of Raindrop Size Distribution From Spaceborne Radar Observations", IEEE Transactions on Geoscience and Remote Sensing, vol. 43, No. 5, May 2005, pp. 1078-1086.

Chandrasekar, V., et al., "Principles of networked weather rader operation at attenuating frequencies", Copernicus CmbH 2004, pp. 109-114.

Chandrasekar et al., "Virtual CSU-Chill Radar: the VCHILL", American Meteorigical Society, vol. 22, Jul. 2005, pp. 979-987.

Gorgucci and Chandrasekar, "Evaluation of Attenuation Correction Methodology for Dual-Polarization Radars: Application to X-Band Systems", American Meteorological Society, Aug. 2005, pp. 1195-1206.

Kabeche and Testud, "Stereoradar Meteorology: A New Unified Approach to Process Data from Airborne or Ground-Based Meteorological Radars", American Meteorological Society, vol. 12, Aug. 1995, pp. 783-799.

Lim, S., et al., "Hydrometeor Classification System Using Dual-Polarization Radar Measurements: Model Improvements and In Situ Verification", IEEE Transactions on Geoscience and Remote Sensing, vol. 43, No. 4, Apr. 2005, pp. 792-801.

Park et al., "Correction of Radar Reflectivity and Differential Reflectivity for Rain Attenuation at X Band. Park II: Evaluation and Application", American Meteorological Society, Nov. 2005, pp. 1633-1655.

Park et al., "Correction of Radar Reflectivity and Differential Reflectivity for Rain Attenuation at X Band. Part I: Theoretical and Empirical Basic", American Meteorological Society, vol. 22, Nov. 2005, pp. 1621-1632.

Rose, C.R., et al., "A Systems Approach to GPM Dual-Frequency Retrieval", IEEE Transactions on Geoscience and Remote Sensing, vol. 43, No. 8, Aug. 2005, pp. 1816-1826.

Rose, C.R., et al., "Extension of GPM Dual-Frequency Iterative Retrieval Method With DSD-Profile Constraint", IEEE Transactions on Geoscience and Remote Sensing, vol. 44, No. 2, Feb. 2006, pp. 328-335.

Srivastava and Tian, "Measurement of Attenuation by a Dual-Radar Method: Concept and Error Analysis", American Meteorological Society, vol. 13, Oct. 1996, pp. 937-947.

Testud et al., "Stereoradar Meteorology: A Promising Technique for Observation of Precipitation from a Mobile Platform", American Meteorological Society, vol. 6, Feb. 1989, pp. 89-108.

Testud et al., "Tests of Rain Profiling Algorithms for a Spaceborne Radar Using Raincell Models and Real Data Precipotation Fields", American Meteorological Society, vol. 13, Apr. 1996, pp. 426-453.

Tian, Lin et al., "Measurement of Attenuation at C Band in a Convective Storm by a Dual-Radar Method", American Meteorological Society, vol. 14, Feb. 1997, pp. 184-196.

Vulpiani, Gianfranco et al., "Constrained Iterative Technique With Embedded Neural Network for Dual-Polkarization Radar Correction of Rain Path Attenuation", IEEE Transactions on Geoscience and Remote Sensing, vol. 43, No. 10, Oct. 2005, pp. 2305-2313.

Xu, Gang et al., "Operational Feasibility of Neural-Network-Based Radar Rainfall Estimation", IEEE Transactions on Geoscience and Remote Sensing, vol. 42, No. 1, Jan. 2005, pp. 13-17.

* cited by examiner

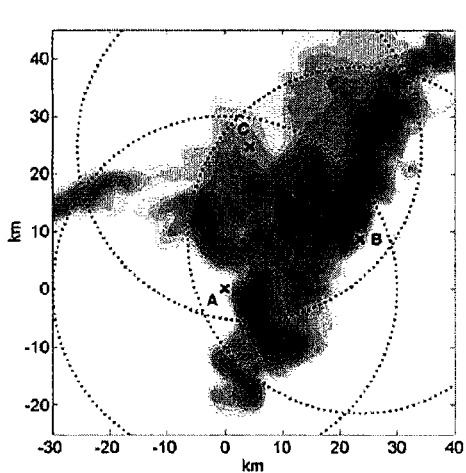 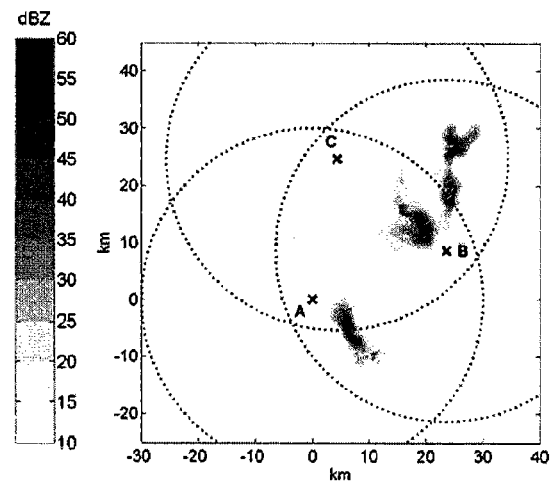
Fig. 9A Fig. 9B
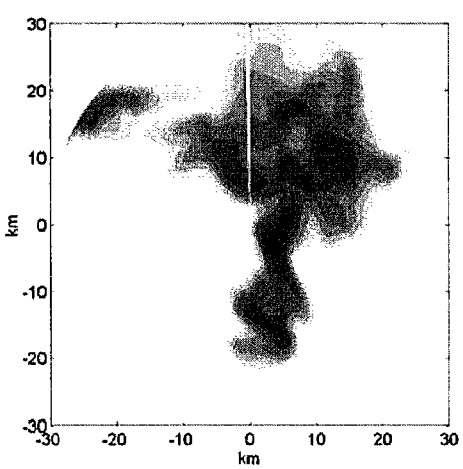 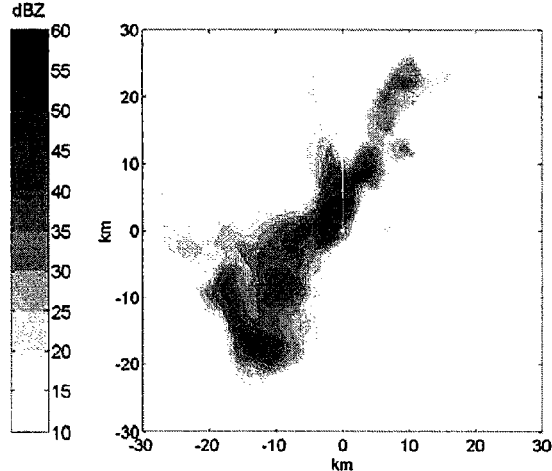
Fig. 9C Fig. 9D
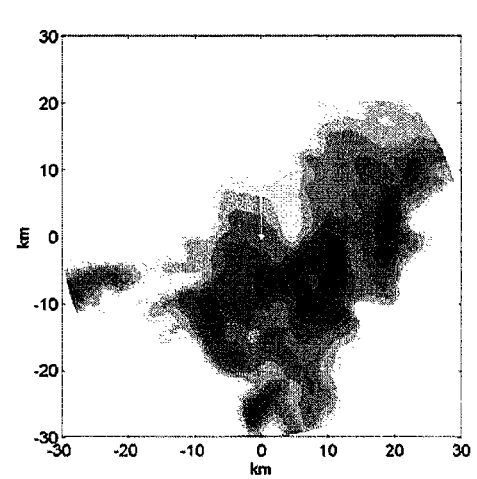
Fig. 9E

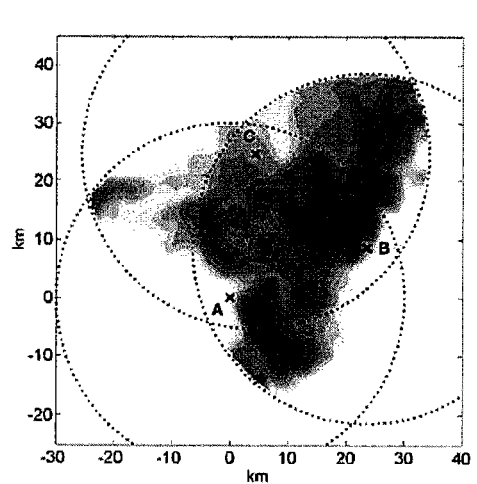 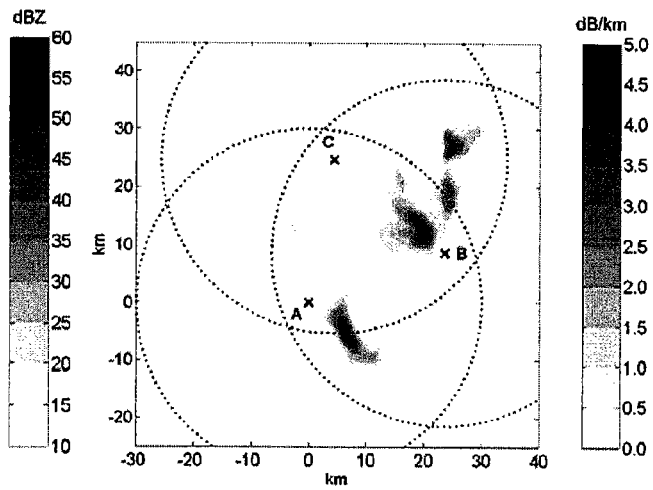
Fig. 9L            Fig. 9M
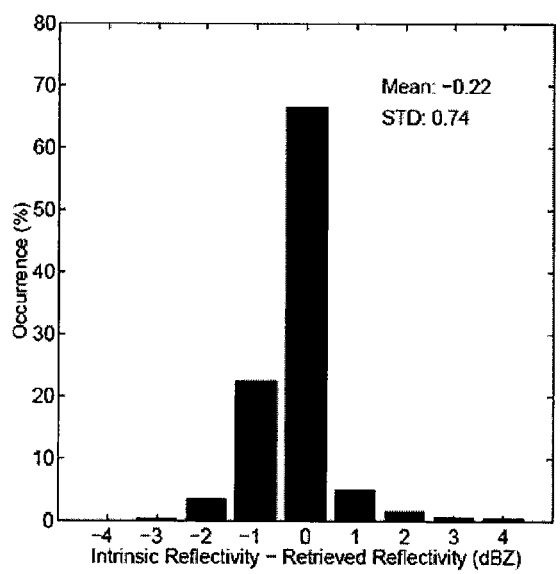 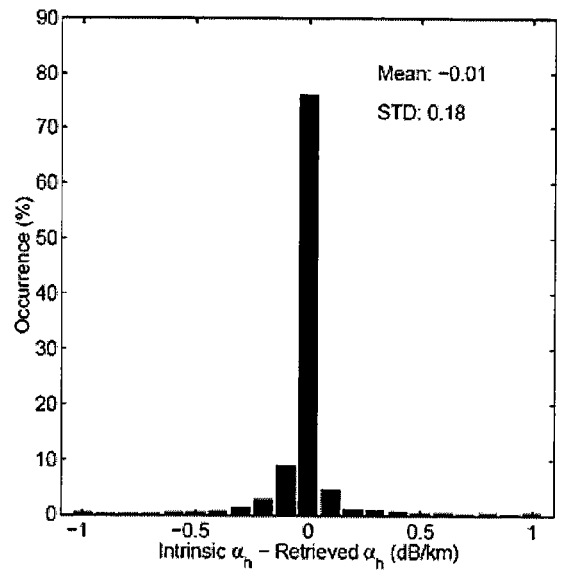
Fig. 9N            Fig. 9O

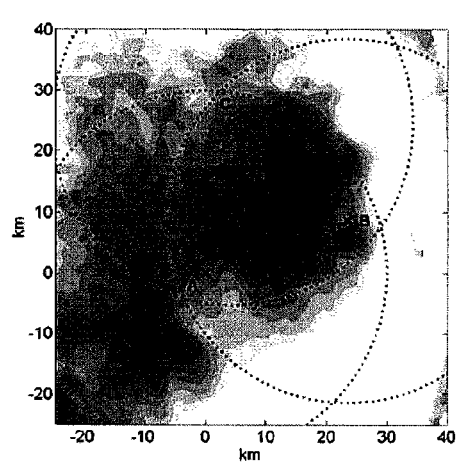
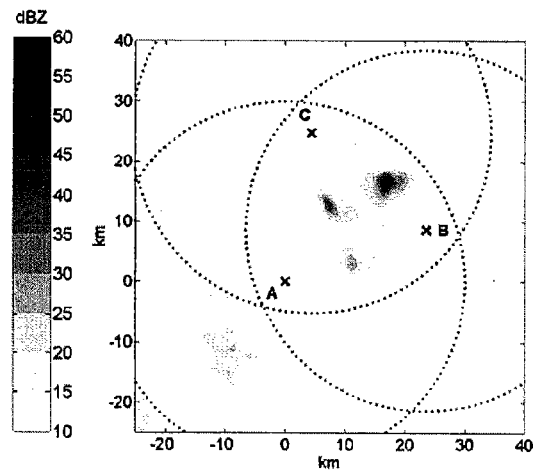
Fig. 10A          Fig. 10B
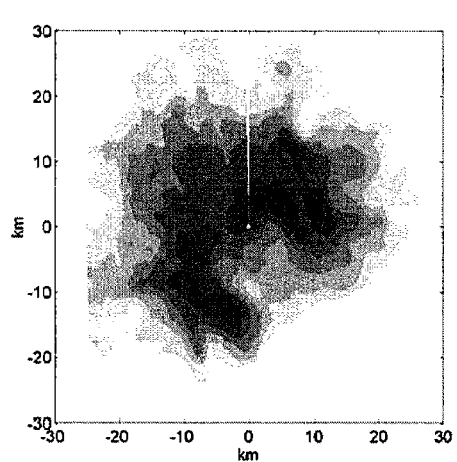
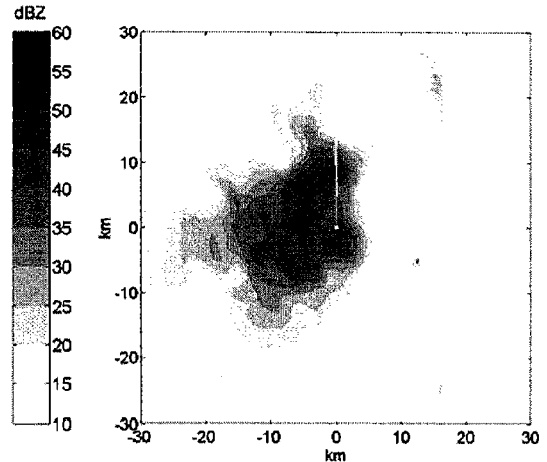
Fig. 10C          Fig. 10D
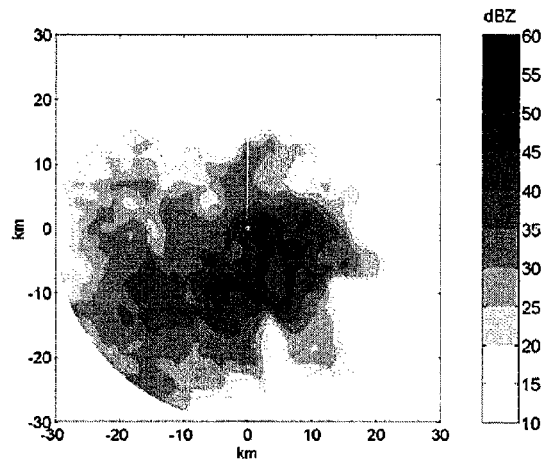
Fig. 10E

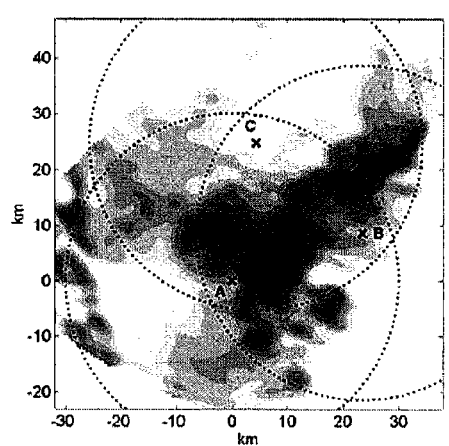 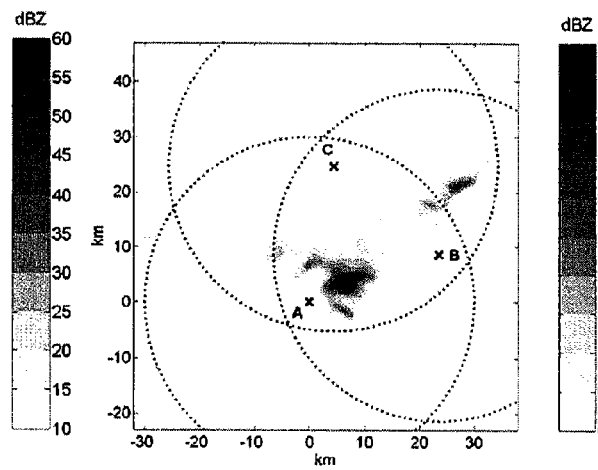
Fig. 11A　　　　　　　　Fig. 11B
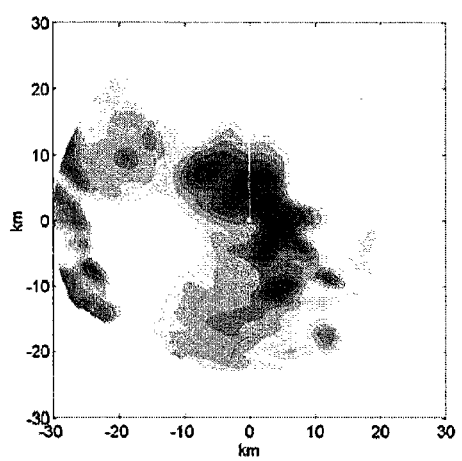 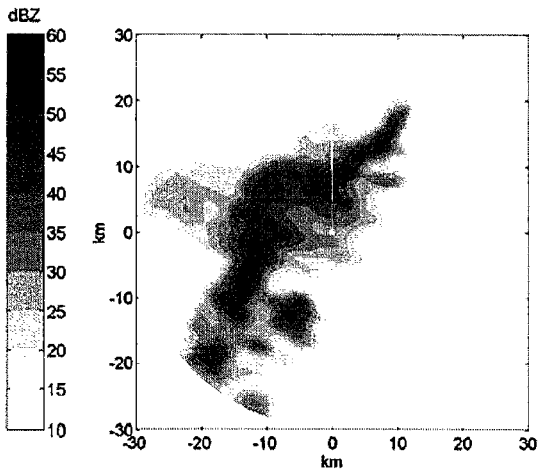
Fig. 11C　　　　　　　　Fig. 11D
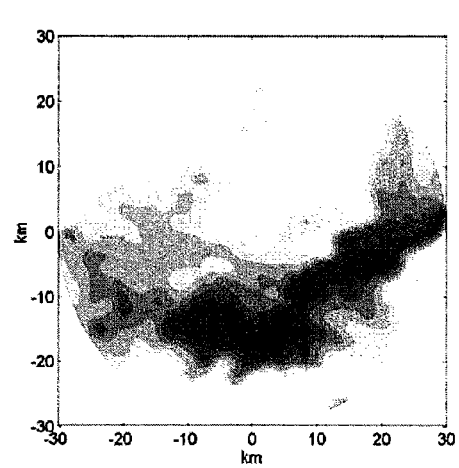
Fig. 11E

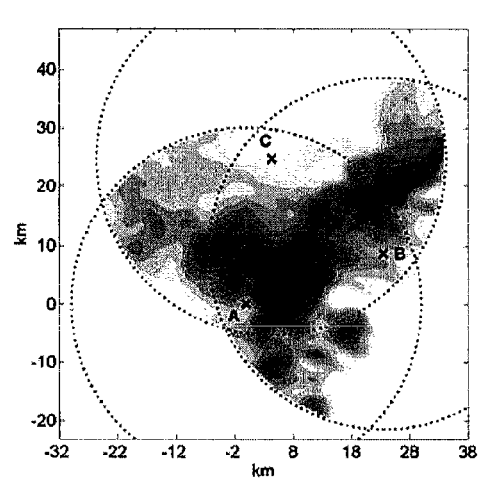 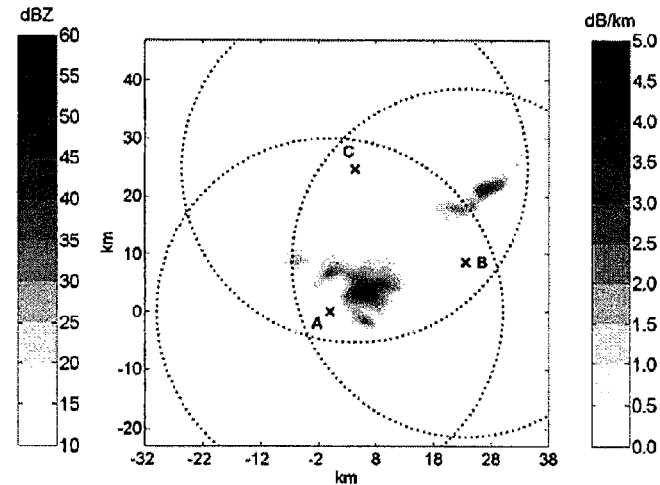
Fig. 11I    Fig. 11J
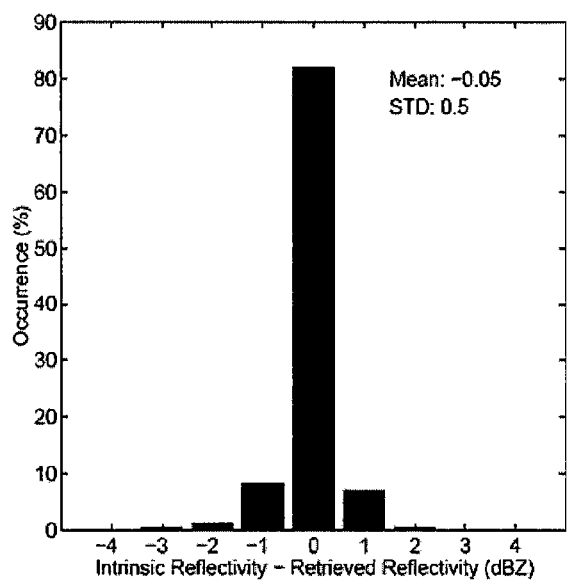 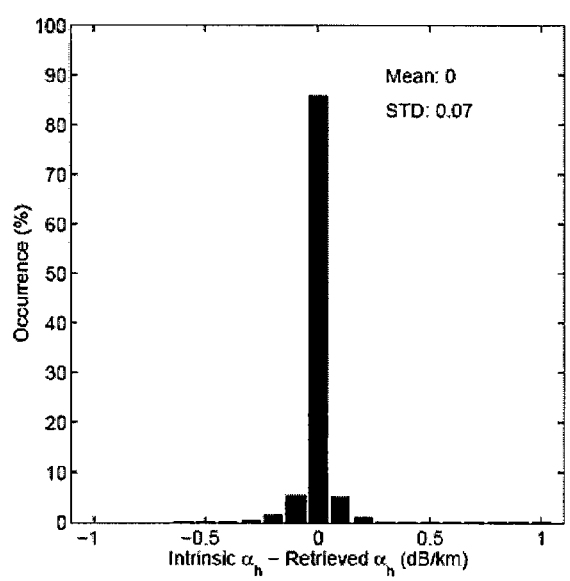
Fig. 11K    Fig. 11L

RETRIEVAL OF PARAMETERS IN NETWORKED RADAR ENVIRONMENTS

STATEMENT AS TO RIGHTS TO INVENTIONS MADE UNDER FEDERALLY SPONSORED RESEARCH AND DEVELOPMENT

This invention was made with Government support under grant EEC0313747 awarded to the University of Massachusetts by the National Science Foundation, subcontracted to Colorado State University under award UM04-002341 B 04.

BACKGROUND OF THE INVENTION

This application relates generally to radar. More specifically, this application relates to methods and systems for retrieving parameters in networked radar environments.

One of the fundamental objectives of meteorological radar systems is to sample the atmosphere surrounding the Earth to provide a quantitative measure of precipitation. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth.

In these types of arrangements, the radar tends to be relatively large. This is a consequence of the geometry and physics of the configuration being studied. In particular, it is desirable to have the radar beam 108 propagate over large distances without attenuation, as might result from interaction of the beam 108 with precipitation in the system. Such conventional systems thus often use S-band radars, whose operational frequencies of 2-4 GHz have minimal attenuation when passing through precipitation. Such frequencies correspond to wavelengths of about 8-15 cm. The wavelength generated by the radar is approximately related to the size of the radar, with S-band radars thus being relatively large. Indeed, it is not uncommon for S-band radars to have dishes that exceed 25 feet in diameter. In addition, as the drawing in FIG. 1 illustrates, a tendency with conventional radar arrangements is to sample portions of the atmosphere that are further above the surface 112 of the Earth at greater distances from the radar; this is a natural result of the geometry imposed on the system by the curvature of the Earth.

It would be desirable to have a system that uses radars at shorter wavelengths since this would permit generally smaller dishes to be used. For example, C-band radars operate at frequencies of 4-8 GHz, which corresponds to wavelengths of 4-8 cm; X-band radars operate with frequencies of 8-12 GHz, which corresponds to wavelengths of 2.5-4 cm; and K-band radars operate with frequencies of 12-40 GHz (with a gap in the band between 18 and 27 GHz due to a strong absorption line in water), which corresponds to wavelengths of 0.75-2.5 cm (with a gap between 1.2 and 1.7 cm). Simple replacement of radars with higher-frequency radars is precluded without some mechanism for accounting for the increase in attenuation that results at higher frequency.

There is accordingly a general need in the art for improved methods and systems for operating radar arrangements.

BRIEF SUMMARY OF THE INVENTION

Embodiments of the invention provide methods and systems that permit retrieval of parameters intrinsic to an environment with radars operating at frequencies that result in attenuation. Such embodiments operate with a networked radar system in which events are simultaneously observed by different radars located in different locations. The effects of attenuation are manifested by the different radars measuring different values of a parameter, such as of the reflectivity at some particular position or volume in the environment being studied. A relationship between the intrinsic value of some parameter, the measured values of the parameters, and the attenuation is solved to retrieve the intrinsic parameter value.

In a first set of embodiments, methods are provided of operating a radar network. Respective radar beams are generated with each of a plurality of radars disposed at different positions within an environment. A respective measured reflectivity of the environment is determined along a respective path of each of the respective radar beams from the generated respective radar beams. The respective measured reflectivity is attenuated along at least a portion of the respective path of at least one of the respective radar beams. An intrinsic reflectivity is determined from different volume elements within the environment from the respective measured reflectivity along the respective path of each of the respective radar beams.

In some of these embodiments, the intrinsic reflectivity is determined for different volume elements by identifying the different volume elements and retrieving an estimate of the intrinsic reflectivity for each of the different volume elements. A cost function defined in terms of the estimate of the intrinsic reflectivity of the different volume elements is calculated, with the estimate being varied to find an extremum of the cost function. In one embodiment, the extremum of the cost function is a local minimum of the cost function.

The estimate of the intrinsic reflectivity of each of the different volume elements may be retrieved by setting an initial seed value of the estimate of the intrinsic reflectivity for a selected one of the volume elements. The estimate of the intrinsic reflectivity for a remainder of the volume elements is then retrieved from the initial seed value and from the measured reflectivity of the environment along the respective path of a selected one of the radar beams.

The cost function may be calculated by retrieving an estimate of a specific attenuation along the respective path of the selected one of the radar beams from the initial seed value and from the measured reflectivity of the environment along the respective path of the selected one of the radar beams. An estimate of a specific attenuation along the respective paths of the remainder of the radar beams is then retrieved from the seed value and from the retrieved estimate of the intrinsic reflectivity for the remainder of the volume elements. In one particular embodiment, the cost function is $$\delta k \equiv \frac{1}{N} \sum_{i=1}^{N} \frac{\sum_{\text{radars}} |\hat{\alpha}_h(V_i) - \overline{\alpha}_h(V_i)|}{\overline{\alpha}_h(V_i) / \sum_{j=1}^{N} \overline{\alpha}_h(V_j)},$$

where N is the number of different volumes along the respective path of the selected one of the radar beams, $\hat{\alpha}_h(V_i)$ is the retrieved estimate of the specific attenuation along the respective path of a respective one of the radars at volume element $V_i$, and $\overline{\alpha}_h(V_i)$ is a mean of $\hat{\alpha}_h(V_i)$ over the plurality of radars.

The different volume elements may be grouped into a plurality of sets of common volume elements. Each set of common volume elements comprises different volume elements disposed along the respective paths of the respective radar beams at an approximately common spatial position within the environment. Each of the different volume elements comprised by each set of common volume elements may sometimes have substantially the same spatial volume.

In some instances, at least two of the respective radar beams have different frequencies. In one embodiment, at least one of the respective radar beams has an X-band frequency.

Sometimes a physical position of at least one of the plurality of radars is moved, with the steps of generating respective radar beams, determining the respective measured reflectivity, and determining the intrinsic reflectivity after moving the physical position being repeated.

Methods for determining the intrinsic parameter may be embodied in a networked-radar evaluation system. Such a system comprises a communications device, a storage device, a processor, and a memory. The processor is provided in communication with the communications device and with the storage device. The memory is coupled with the processor and comprises a computer-readable storage medium having a computer-readable program embodied therein. The computer-readable program has instructions for directing operation of the networked-radar evaluation system to determine an intrinsic parameter of an environment from received data in accordance with the methods described above.

Still another set of embodiments is directed to a radar network. The radar network comprises a plurality of radars disposed at different positions within an environment and a computational unit interfaced with the plurality of radars. The computational unit has instructions to determine an intrinsic reflectivity along a respective path of each of a plurality of respective radar beams. The respective measured reflectivity is attenuated along at least a portion of the respective path of at least one of the respective radar beams. In certain specific embodiments, the instructions to determine the intrinsic reflectivity comprise instructions to implement aspects of the methods described above.

One example of a deployment of the plurality of radars occurs when they are disposed on cellular-telephone towers. In some deployments, at least one of the radars may be in motion relative to another of the radars, such as in embodiments where at least one of the radars is disposed on a moving vehicle.

The computational unit may sometimes additionally have instructions to determine a velocity from Doppler information embodied in the respective measured reflectivity along the respective path of each of the plurality of respective radar beams.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

FIGS. 10A-10L are results of applying the method of FIG. 3A in a second example; and FIGS. 11A-11L are results of applying the method of FIG. 3A in a third example.

DETAILED DESCRIPTION OF THE INVENTION

1. Overview

Embodiments of the invention make use of a networked radar environment in which a plurality of electromagnetic beams are generated by a corresponding plurality of radars. The basic principle of such a networked arrangement is to provide good coverage, in terms of accuracy and resolution to a focused area using the radar network. In various embodiments, the frequency of each of the radars may be greater than 4 GHz, greater than 6 GHz, greater than 8 GHz, greater than 10 GHz, or greater than 12 GHz. In some instances, each of the radars may operate at substantially the same frequency, but this is not a requirement of the invention and, in other instances, different radars may operate at substantially different frequencies.

At these operational frequencies, intrinsic parameters of the environment being studied cannot be directly measured because of the effects of attenuation due to precipitation. At frequencies less than 35 GHz, the attenuation is due substantially from absorption by water; at frequencies greater than 35 GHz, the attenuation results both from absorption by water and from scattering. Radar measurements provide an example of volumetric-scattering measurements and electromagnetic waves backscattered from a common volume in a networked radar system may be attenuated differently along the different paths. As explained in detail below, intrinsic parameters such as the reflectivity and specific attenuation may be described in terms of integral equations obtained by applying back-scatter and forward-scatter equations of the precipitation medium with total path attenuation constraints. Certain embodiments of the invention permit the resulting integral equations to be solved to determine the intrinsic properties.

2. Networked Radar Environments

Figure 1:
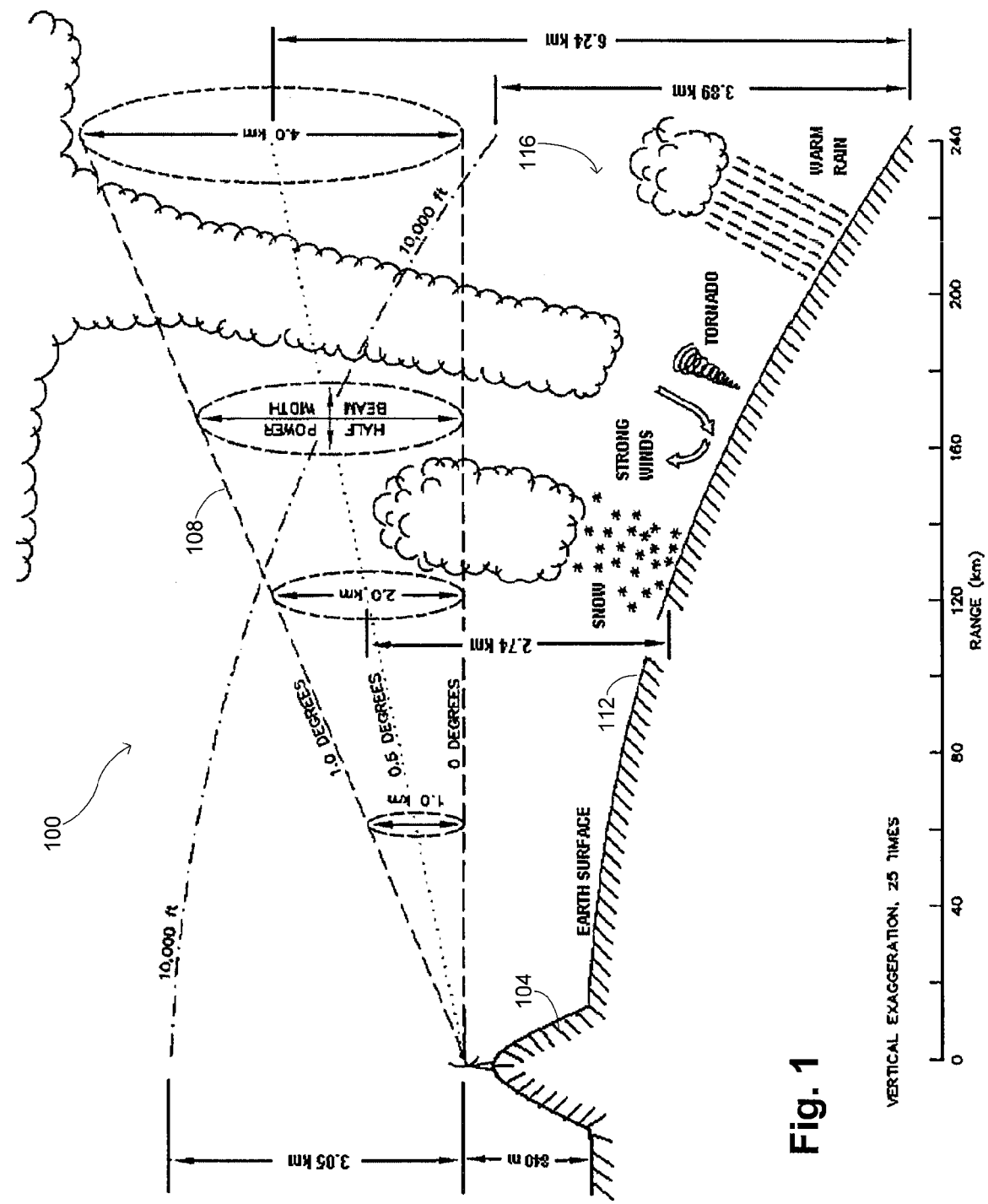
FIG. 1 provides a schematic illustration of the operation of a conventional radar system (reproduced from the National Academy of Sciences Report, "Flash flood forecasting over complex terrain")
Figure 2:
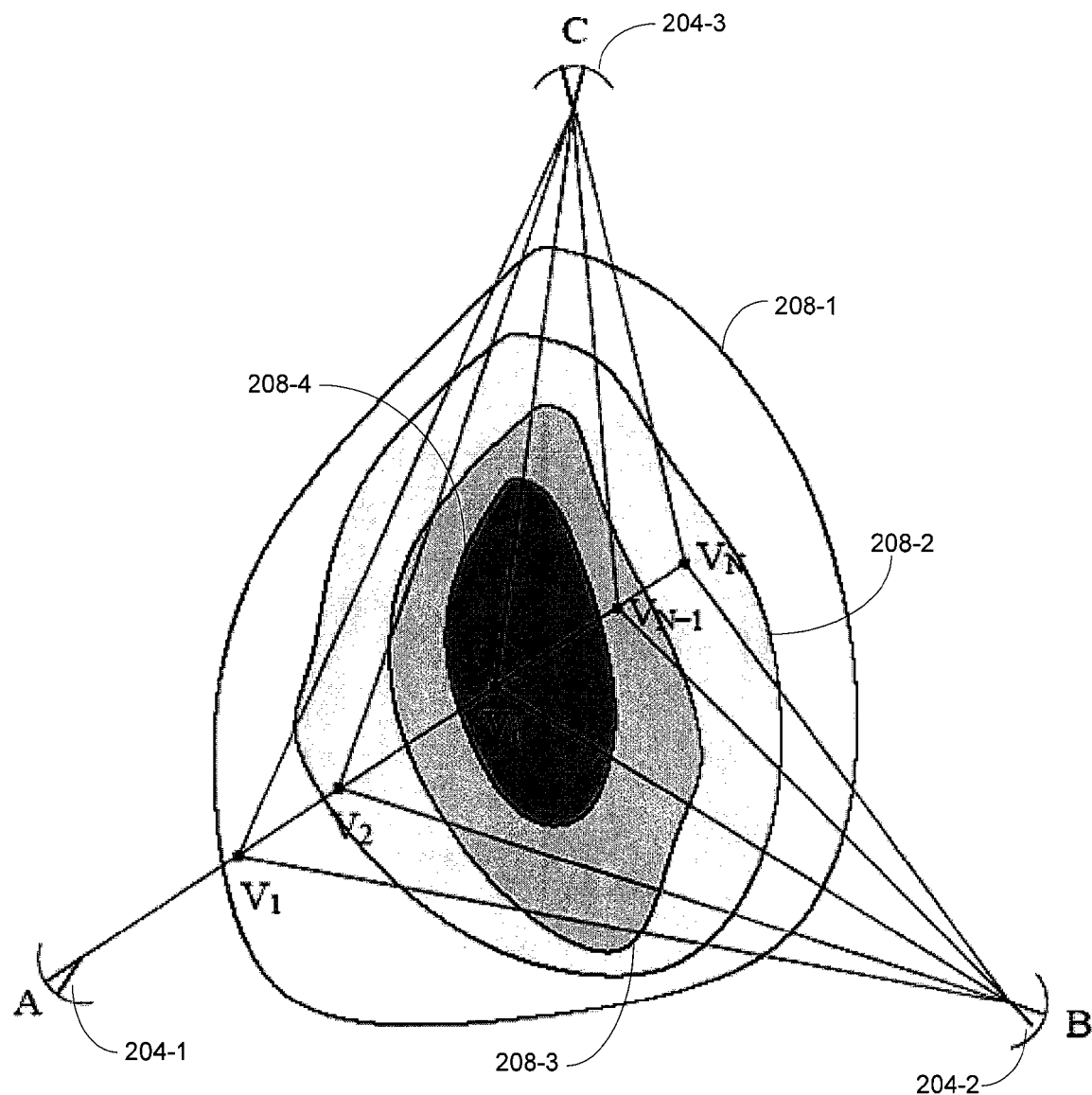
FIG. 2 provides a schematic illustration of a networked radar environment that uses a plurality of radars.

The basic structure of a networked radar system is illustrated in FIG. 2. In this drawing, and in much of the discussion presented herein, the networked radar system has three radars 204, labeled "A," "B," and "C." Illustrations using three radars are provided for exemplary purposes and are not intended to be limiting; it will be evident to those of skill in the art how to extend the methods and systems described herein to a system having an arbitrary plurality of radars.

The illustration in FIG. 2 shows that each of the radars 204 may generate its own beam so that substantially simultaneous observations may be made of the same event by the different radars 204 in different locations. Reflectivities $Z'_h(r)$ are measured by each of the radars 204 along the path of their respective beams. The measurements made by each of the radars 204 is expected to be different because of the effects of attenuation, but the intrinsic reflectivity $Z_h(r)$ of the environment will be the same at any given point in space. Embodiments of the invention thus define a plurality of common volumes V 208 within which the intrinsic reflectivity $Z_h(r)$ is expected to be the same, irrespective of the values of the reflectivities measured by each of the radars 204, i.e.

$$Z_{h,A}(V_i) = Z_{h,B}(V_i) = Z_{h,C}(V_i) = \ldots = Z_h(V_i). \quad (1)$$

Reflectivity has dimensions of (area/length)$^3$ so that commonly used units are mm$^6$/m$^3$.

The specific attenuation $\alpha_h(r)$ may be reasonably described with respect to the intrinsic reflectivity $Z_h(r)$ by a power law $$\alpha_h(r) = a[Z_h(r)]^b \quad (2)$$

An interpretation of the coefficients a and b may be provided with the concept of normalized drop-size distribution as described in Bringi, V. N. and V. Chandrasekar, *Polarimetric doppler weather radar: Principles and applications* (Cambridge University Press, New York, N.Y. 2001), the entire disclosure of which is incorporated herein by reference. The measured reflectivity $Z'_h(r)$ at range r may be expressed in terms of the (unattenuated) intrinsic reflectivity $Z_h(r)$ and specific attenuation $\alpha_h(r)$ as $$Z'_h(r) = Z_h(r) \exp\left[-0.46 \int_0^r \alpha_h(s) \, ds\right]. \quad (3)$$

The integrated path attenuation may be expressed in terms of the intrinsic reflectivity $Z_h(r)$ And attenuated reflectivity $Z'_h(r)$ as $$2 \int_{r_0}^r \alpha_h(s) \, ds = 10 \log_{10}(Z_h(r)) - 10 \log_{10}(Z'_h(r)), \quad (4)$$

where $r_0$ is the range corresponding to the first resolution volume with precipitation. After modest algebraic manipulation using Eqs. (2)-(4), the specific attenuation along the path may be retrieved as $$\left. \begin{array}{l} \Delta Z(r_m) = 10 \log_{10}(Z_h(r_m)) - 10 \log_{10}(Z'_h(r_m)) = 2 \int_{r_0}^r \alpha_h(s) \, ds; \\[6pt] \hat{\alpha}_h(r) = \dfrac{[Z'_h(r)]^b (10^{0.1 b \Delta Z(r_m)} - 1)}{I(r_0; r_m) + (10^{0.1 b \Delta Z(r_m)} - 1) I(r; r_m)}; \\[6pt] I(r_0; r_m) = 0.46 \int_{r_0}^{r_m} [Z'_h(s)]^b \, ds, \end{array} \right\} \quad (5)$$

where $\Delta Z(r_m)$ is the difference between intrinsic reflectivity and attenuated reflectivity, namely two-way cumulative attenuation, and parameter b corresponds to the $\alpha$-Z relation. The retrieved reflectivity $\hat{Z}_h(r)$ can be expressed with respect to attenuated reflectivity and retrieved specific attenuation $\hat{\alpha}_h(r)$ as $$10 \log_{10}(\hat{Z}_h(r)) = 10 \log_{10}(Z'_h(r)) + 2 \int_{r_0}^r \hat{\alpha}_h(s) \, ds. \quad (6)$$

3. Retrieval of Intrinsic Parameters

Equations (5) and (6) permit calculation of the specific attenuation distribution and reflectivity along a path $r_0$ to $r_m$ once the intrinsic reflectivity $Z_h$ at range $r_m$ is known. Embodiments of the invention make use of an iterative technique for minimizing a cost function as outlined in FIG. 3. Minimization of a cost function is an example of a more general technique of finding an extremum of a cost function since it is possible to define cost functions where optimization occurs at a maximum of the cost function rather than at a minimum of the cost function. The method begins as indicated at block 304 by identifying a set of N common volumes, with the cost function being defined so that it is minimized when optimal values of the intrinsic reflectivity in each of the volumes are identified. This is subject to the expression in Eq. (1) that the intrinsic reflectivity be well defined within each of the common volumes, in the sense that measurements made by any of the radars are consistent with the same value for the intrinsic reflectivity.

The iterative technique begins at block 308 by setting a seed value for the intrinsic reflectivity $Z_h^{(seed)}$ at one of the common volumes, designated to be volume $V_N$ in this example. While, in principle, the method may converge to determine the intrinsic parameters with any seed value, it is generally expected to be more efficient for a seed value closer to the actual intrinsic reflectivity in that volume. In one embodiment, the initial seed value $Z_h^{(seed)}$ is set to be the maximum of the observed reflectivity for the volume $V_N$ (FIG. 2) by each of the radars:

$$Z_h^{(seed)} = \max \left[ Z'_{h,A}(V_N) Z'_{h,B}(V_N), Z'_{h,C}(V_N) \right]$$

With the seed value, Eqs. (4) and (5) may be used at block 312 to determine nominal values for the intrinsic reflectivity and specific attenuation along a path from a first of the radars to the selected volume, i.e. to determine $Z_{h,A}^1(V_1)$, $Z_{h,A}^1(V_2)$, ..., $Z_{h,A}^1(V_N)$ and $\alpha_{h,A}^1(V_1), \alpha_{h,A}^1(V_2), \ldots, \alpha_{h,A}^1(V_N)$, where the superscript indicates the level of iteration. The nominal values for the intrinsic reflectivity as observed by the selected radar (which by Eq. (1) are the same intrinsic reflectivity values observed by the other radars) may then be used again with Eqs. (4) and (5) at block 316 to determine nominal values for the specific attenuation for each of the other radars, i.e. to determine $\alpha_{h,B}^{1}(V_1)$, $\alpha_{h,B}^{1}(V_2)$, ..., $\alpha_{h,B}^{1}(V_N)$, $\alpha_{h,C}^{1}(V_1)$, $\alpha_{h,C}^{1}(V_2)$, ..., $\alpha_{h,C}^{1}(V_N)$, etc.

The nominal values are used at block 320 to calculate the cost function δk. In one embodiment, the cost function is defined as a weighted difference of specific attenuation values along each radar path in the common volumes, although other cost functions may be used in alternative embodiments. That is, in the illustrated embodiment, the cost function is $$\delta k \equiv \frac{1}{N} \sum_{i=1}^{N} \frac{\sum_{radars} |\hat{\alpha}_h(V_i) - \overline{\alpha}_h(V_i)|}{\overline{\alpha}_h(V_i) / \sum_{j=1}^{N} \overline{\alpha}_h(V_j)}, \quad (7)$$

where $\overline{\alpha}_h(V_j)$ is the mean value of the retrieved specific attenuation $\hat{\alpha}_h$ at volume $V_i$ averaged over the radars:

$$\overline{\alpha}_h(V_i) \equiv \frac{1}{\text{no. of radars}} \sum_{radars} \hat{\alpha}_h(V_i). \quad (8)$$

The cost function δk is checked at block 324 to determine whether an extremal value has been found. With the definition of the cost function provided above, this check comprises checking whether the cost function δk has reached a minimum value. If not, the seed reflectivity value $Z_h^{(seed)}$ is perturbed at block 328 and the process repeated until an extremum is reached. At this point, and as indicated at block 332, the value of the seed reflectivity that results in an extremal value of the cost function is designated as the intrinsic reflectivity, $$Z_h^{(seed)} = Z_h(V_N),$$

and the values calculated using Eqs. (4) and (5) are designated to be intrinsic reflectivities for the set of volumes and specific attenuations associated with each of the radars.

Figure 3A:
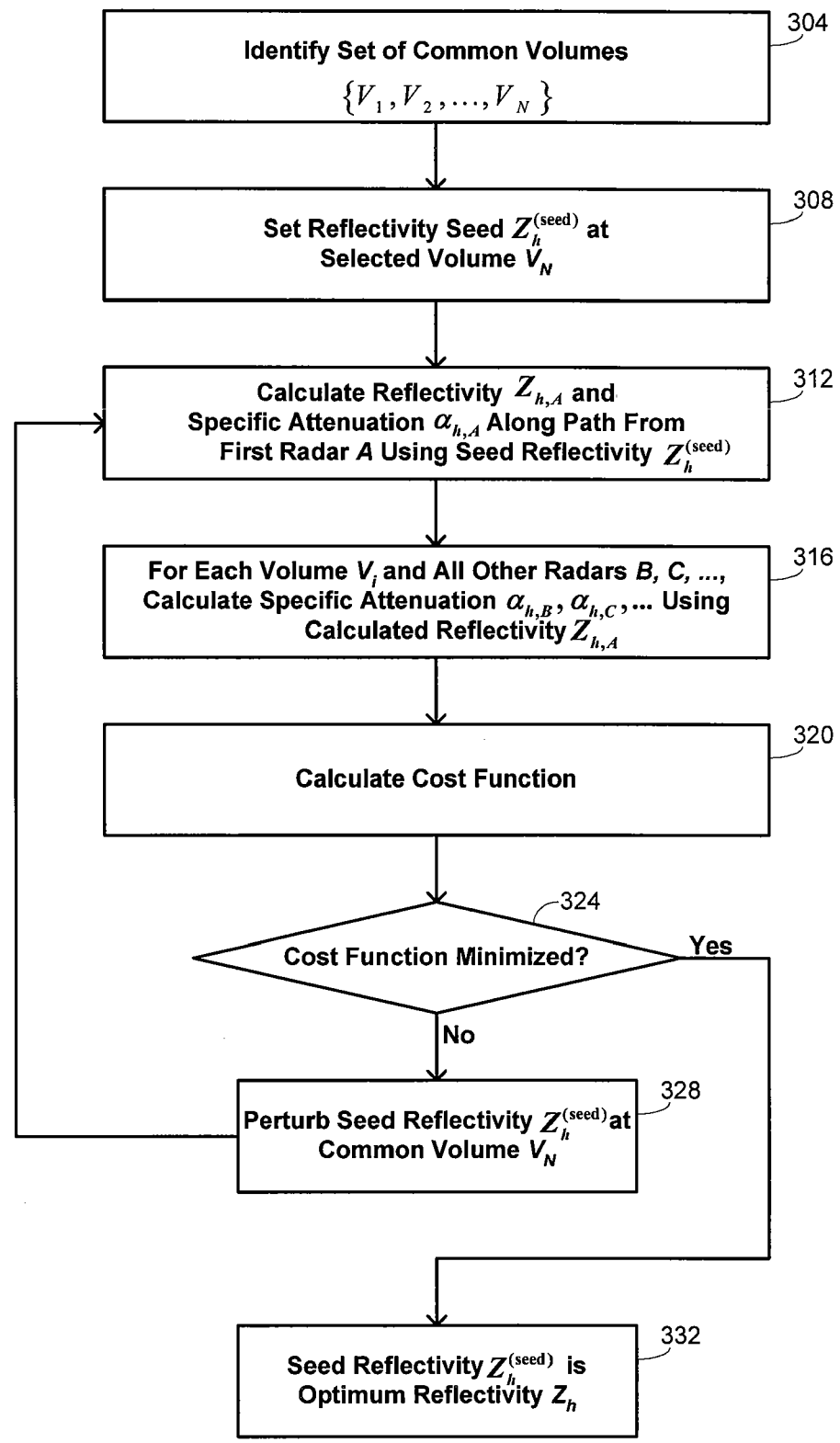
FIG. 3A is a flow diagram that summarizes methods for retrieving intrinsic parameters from measurements made using the networked radar environment illustrated in FIG. 2.
Figure 3B:
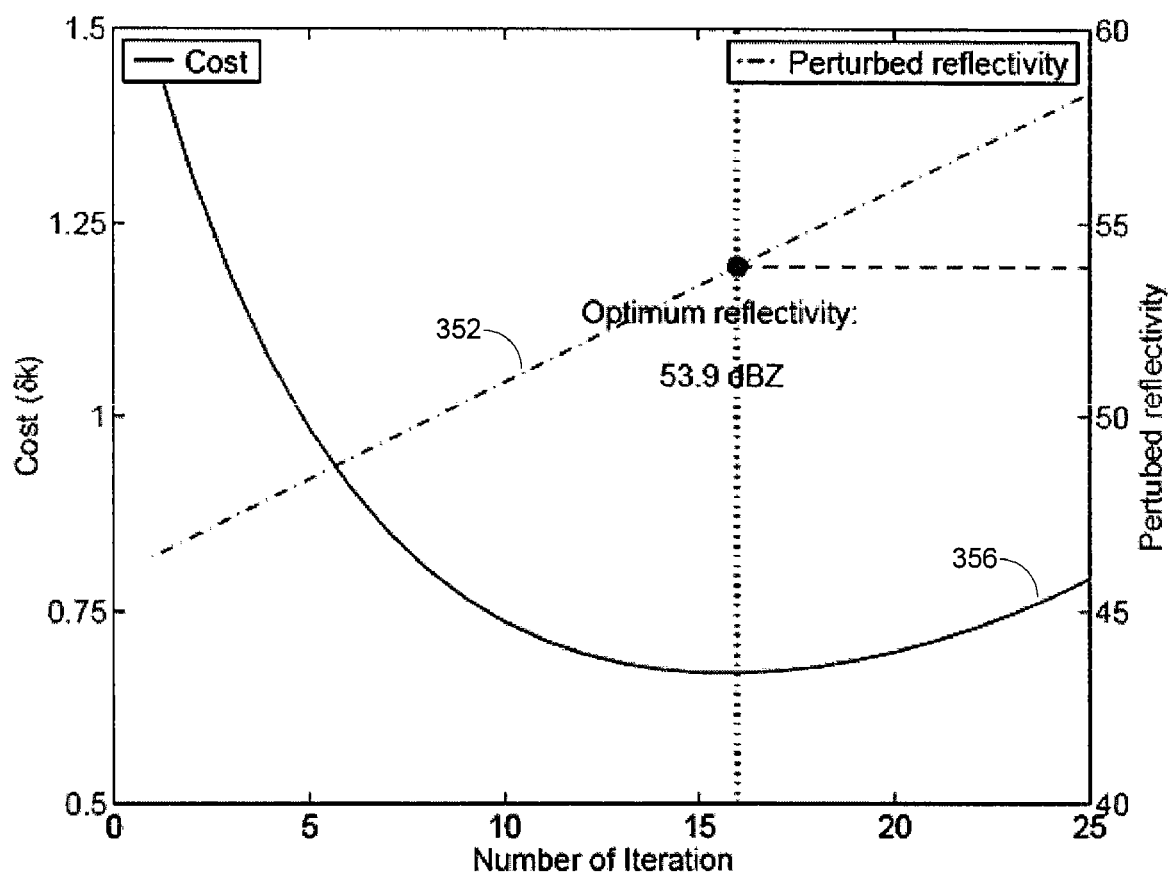
FIG. 3B provides an illustration of minimization of a cost function as implemented by the method of FIG. 3A.

An illustration of use of the method is provided with the graph in FIG. 3B, with data having been collected for the illustration with a system having three radars, A, B, and C. The abscissa shows the iteration number, with curve 352 indicating the value of the seed reflectivity $Z_h^{(seed)}$ for that iteration and referring to the scale on the right ordinate of the graph. The resulting value of the cost function δk for that iteration is shown with curve 356, with values of the cost function being provided with the left ordinate. Smooth curves have been drawn through the discrete values of the reflectivity and cost function to illustrate the generally smooth and continuous relationship between the selected seed reflectivity and resulting cost function. In the illustrated example, the cost function approaches a minimum value at iteration number 16, where the seed reflectivity had a value of 53.9 dBZ. For this particular example, then, the intrinsic reflectivity at volume $V_N$ is 53.9 dBZ, from which the intrinsic reflectivity in other volumes and specific attenuations may be calculated as described above.

Figure 4A:
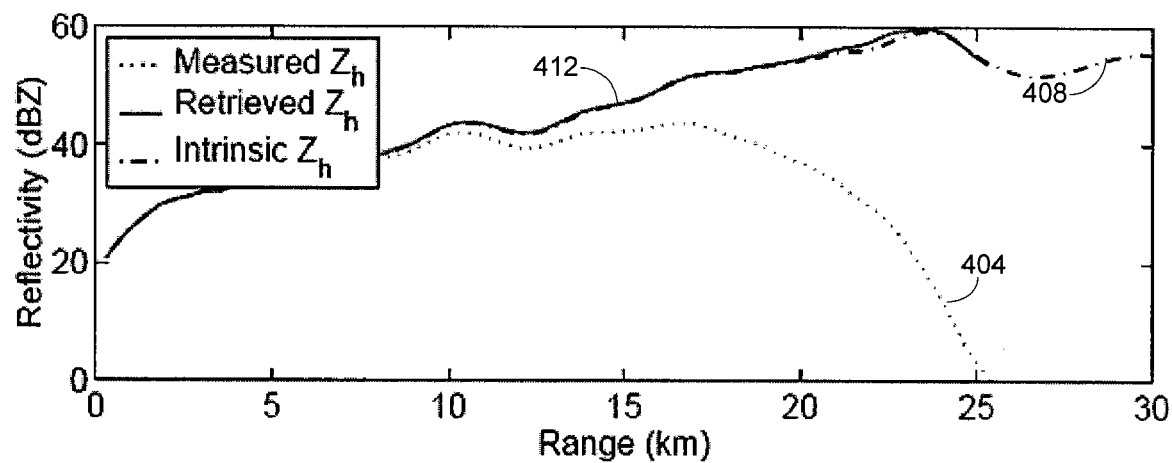
FIGS. 4A and 4B show results of retrieving reflectivity and specific attenuation from a networked radar environment using the method of FIG. 3A.
Figure 4B:
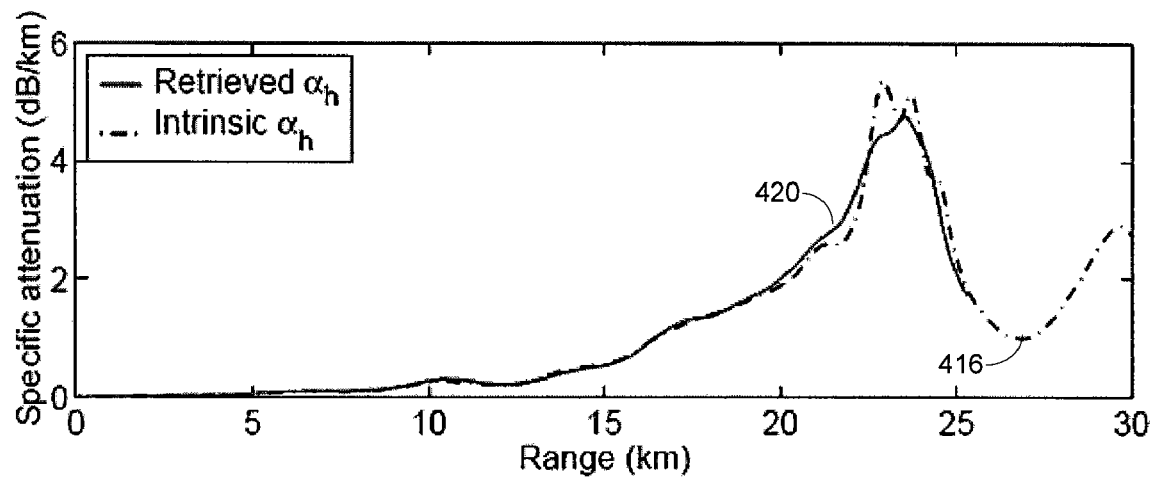

Results of such calculations are presented in FIGS. 4A and 4B as a function of range from the selected radar, i.e. from radar A. Reflectivities are shown in FIG. 4A and specific attenuations are shown in FIG. 4B. The effect of attenuation on the measured reflectivity 404 is evident in FIG. 4A by the dropoff when the range is above about 15 km. The retrieved reflectivity $\hat{Z}_h(r)$ 412 and the determined behavior of the intrinsic reflectivity $Z_h(r)$ 408 both show that the intrinsic behavior of the reflectivity is actually opposite, generally increasing even above 15 km. The decrease in the measured reflectivity may be understood by an examination of the retrieved specific attenuation $\hat{\alpha}_h(r)$ and determined intrinsic specific attenuation $\alpha_h(r)$, which show a significant increase when the range from the radar is greater than about 15 km.

In the illustration of FIG. 3B, the seed reflectivity $Z_h^{(seed)}$ was increased linearly with iteration number, permitting an identification of the minimal cost function as the seed reflectivity first approaches the intrinsic value and then moves away from the intrinsic value. This is one of many different techniques that may be used to identify the seed reflectivity that produces an extremal value. For example, in some embodiments, the seed reflectivity might be perturbed with by a relatively large amount to map out very general features of the cost function; this may then be followed with a more detailed mapping of the cost function in a range of seed values thereby identified as including the intrinsic value. This could be repeated multiple times with progressively smaller perturbation increments being applied to progressively smaller seed-value ranges to refine the determination to the desired level of significance. Such an approach is generally more efficient than stepping through all seed values over the initial range with the most significant perturbation increments. Still other variant strategies may be used in efficiently honing in on the seed value that produces the extremum in cost function.

In some embodiments, failsafe mechanisms may be included as part of the method to detect such situations as where there is no local extremum to prevent the solution from diverging or where the convergence is very slow. For example, in one embodiment, a derivative of the cost function is calculated once multiple values of the cost function have been determined for different seed values. If the calculated derivative is less than some defined threshold value, iteration may be halted.

One potential source of inaccuracy in implementations of the method is related to the definition of the common volumes. The radar measurements are volumetric-scattering measurements, meaning that the selected common volumes are treated in the calculations as volume-filled scatterers. This is different than other types of scattering arrangements such as might be realized with point scatterers. This physical characteristic results in there being some difference in the volume elements for different radars, despite their nominal description above as being "common." Specifically, a beam from a radar will have a generally conical shape, with its cross-sectional area expanding at farther ranges; this conical shape may sometimes be circularly conical or elliptically conical. Volume elements corresponding to a particular radar thus have a frustroconical shape about an axis that extends from that radar.

Figure 5:
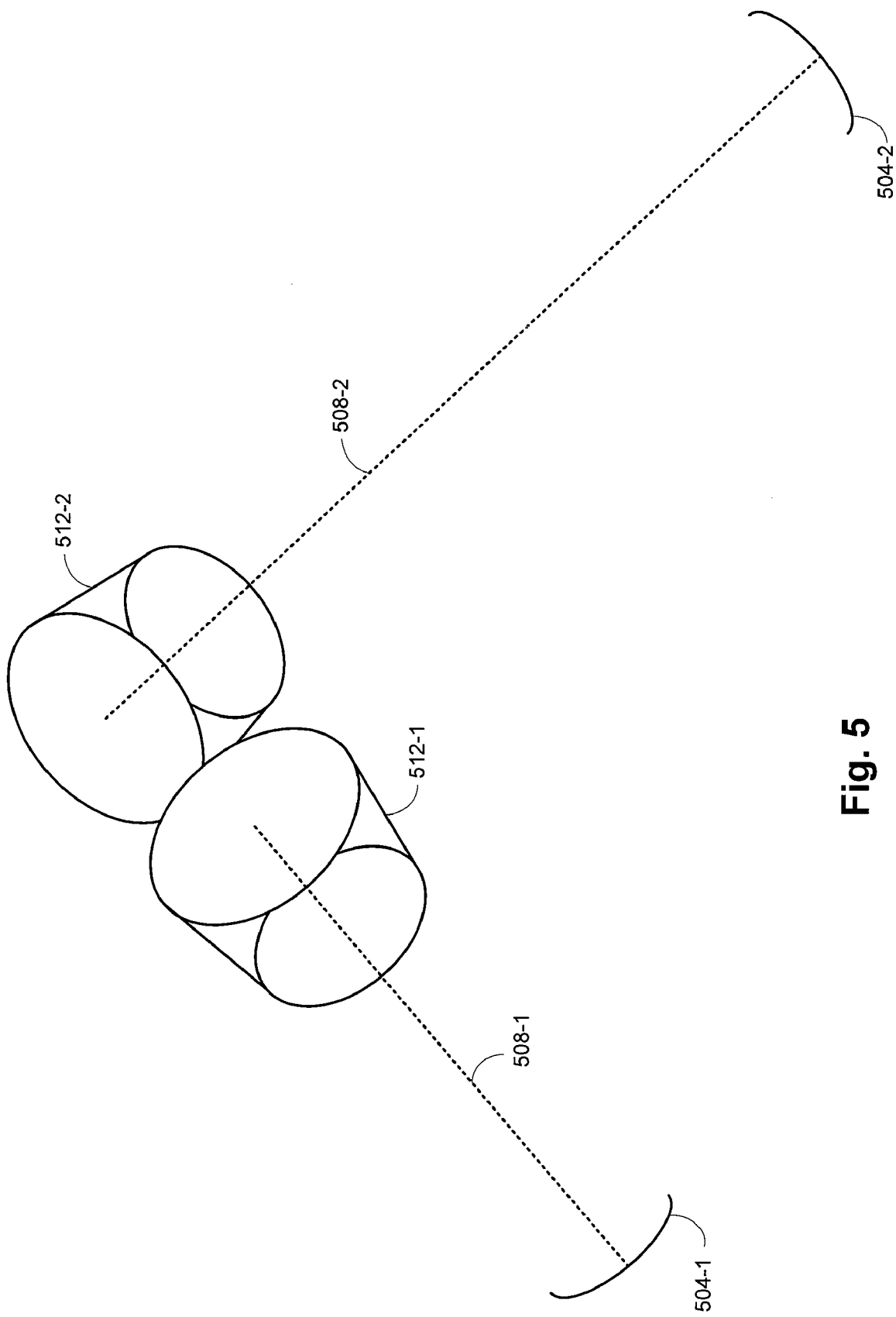
FIG. 5 provides an illustration of volume-shape issues that may arise with networked radar environments.

These geometrical features are illustrated schematically in FIG. 5, which show two volume elements 512, each of which has a frustroconical shape about an axis 508 that extends from the respective radars 504. For purposes of illustration, the volume elements 512 have been displaced, but in actual implementations of the method will substantially occupy the same region of space. It is evident, however, that even when so positioned, the actual region encompassed by each of the elements 512 will be slightly different. To ensure substantial satisfaction of Eq. (1) above, the elements 512 are constructed to have substantially equal volumes by selecting appropriate heights for the frustroconical elements; the cross-sectional areas of the elements are dictated by the configuration of the radar beam and by the distance of the volume element from the radar source. For instance, because radar 504-1 is closer the position of the volume elements shown in FIG. 5 than is radar 504-2, volume element 512-1 may be constructed with a longer height than volume element 512-2 to compensate for the fact that it consequently has a smaller cross-sectional area. The volume elements for each of the radars may be disposed so that they substantially share a common center, which may be defined to lie along the axis 508 at an area-weighted average of the elements height.

Figure 6:
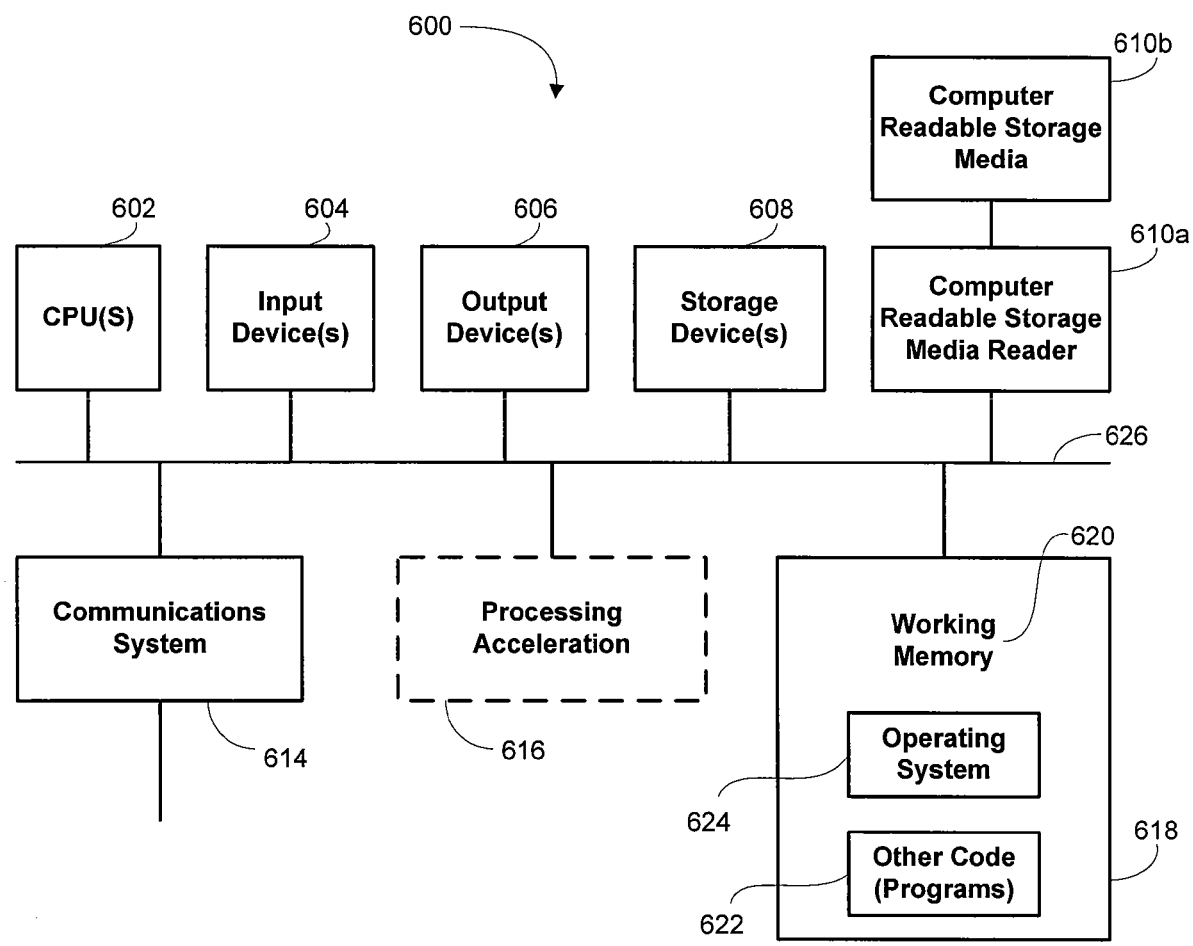
FIG. 6 is a schematic illustration of a computational system on which methods of the invention may be embodied.

The methods described in connection with FIG. 3A may be implemented with a computational device such as shown schematically in FIG. 6, which broadly illustrates how individual system elements may be implemented in a separated or more integrated manner. The device 600 is shown comprised of hardware elements that are electrically coupled via bus 626. The hardware elements include a processor 602, an input device 604, an output device 606, a storage device 608, a computer-readable storage media reader 610a, a communications system 614, a processing acceleration unit 616 such as a DSP or special-purpose processor, and a memory 618. The computer-readable storage media reader 610a is further connected to a computer-readable storage medium 610b, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be collected from the radars. In some instances, such data collection is performed in real time by the communications system in evaluating the intrinsic parameters of the environment.

The computational device 600 also comprises software elements, shown as being currently located within working memory 620, including an operating system 624 and other code 622, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

4. Illustrative Applications

As described above, methods of the invention are generally applicable to any system having a plurality of radars in a networked arrangement. While some specific applications are noted here, this identification is not intended to be exhaustive and the generality of the methods will allow those of skill in the art to realize numerous other applications after reading this disclosure.

In one application, the plurality of radars is disposed in fixed locations, such as on an arrangement of cellular-telephone towers. Such a distribution of radars permits investigation of various geographical regions, perhaps by using subsets of the total number of radars when focusing on specific geographical regions, to provide a quantitative measurement of precipitation. In addition, such a distribution permits application of methods of the invention to backhall networks between the cellular-telephone towers. Such networks have propagation measurements associated with drops in power level; this is a form of attenuation to which methods of the invention may also be applied.

Furthermore, it was previously noted that the methods are not restricted to networks in which all of the radars operate at the same frequency. Since the network may have radars with different operational frequencies, it is possible to add radars to the network without being constrained by the character of the existing radars. For instance, a network that already comprises multiple C-band radars may be expanded with the addition of X-band radars. This gives the technique considerable flexibility that may be exploited differently in different circumstances to meet a variety of different requirements.

In another application, the radars are disposed on objects that are in motion. For instance, the radars could be provided on emergency land vehicles so that when the vehicles are disposed to the site of an accident or disaster, they may be used to form a radar network. The flexibility of the methods to accommodate different frequencies may also be realized in these types of embodiments since it may not be known in advance which vehicles will be dispatched to a particular site and vehicles provided by different response departments could operate of different frequencies.

Furthermore, the radar network may be formed even while the vehicles are in motion, providing a dynamic radar network that may collect measurements and retrieve intrinsic parameters as the location and overall shape of the network changes with the motion of the vehicles. This is because the time for retrieval of the parameters is an electronic timescale, which is much smaller than the timescale of motion of the vehicles. Radars may thus advantageously be disposed on any type of vehicle, including land vehicles like cars, buses, trains, and the like; may be disposed on any type of airborne vehicle, including airplanes, helicopters, and the like; and may be disposed on any type of seagoing vessel, including ships, submarines, and the like. Indeed, there may be circumstances when both land and air vehicles have radars used in forming the network, or when both air and sea vehicles have radars used in forming the network, etc.

The ability to retrieve intrinsic parameters from a networked radar environment also permits Doppler measurements to be made when there are sufficiently many radars. For example, each radar may measure a velocity component in the direction of its respective radar beam. When there are at least three radars generating linearly independent beams, the full three-dimensional Doppler information may be collected and used to measure complete velocity information.

It is noted in the context of these various applications that the method of retrieval described in connection with FIG. 3A is not a tomographic method. Specifically, tomographic-type applications rely on discrete measurements across may planes to generate a stable solution. This is not the case with methods of the invention, which do not rely on multiple discrete measurements but instead generate a range profile from the collected information.

5. Examples

Figure 7A:
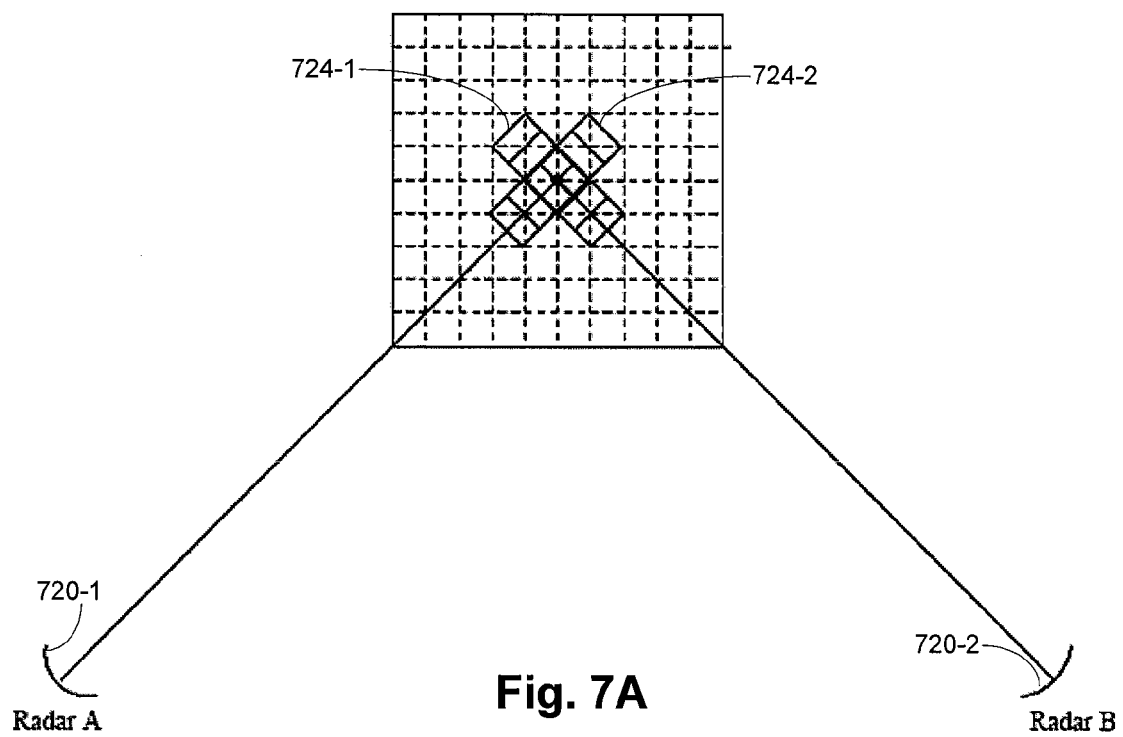
FIG. 7A provides an illustration of range-resolution issues that may arise with networked radar environments.

Inaccuracies in applying the methods of FIG. 3A may be expressed by relaxing the condition of Eq. (1) and explicitly including variations in the intrinsic reflectivities that arise from such factors as variations in range resolution and in pointing mismatch. The potential for variations in range resolution volume is illustrated schematically in FIG. 7A and for pointing mismatch in FIG. 7B. As illustrated in FIG. 7A, signals provided by radars 720 produce different volumes 724, with potential variations in range resolution volume being expected when the beam width provided by the antennas is greater than about 1°. The reflectivity at common volume with such a range resolution adjustment may be expressed as $$Z_h(V_N) = Z_{h,A}(V_N) + \delta Z_{h,A}{}^V(V_N) = Z_{h,B}(V_N) + \delta Z_{h,B}{}^V(V_N) = \ldots,  \quad (9)$$

where $\delta Z_{h,R}{}^V(V_N)$ denotes a reflectivity adjustment attributable to range resolution variations for radar R at common volume $V_N$.

Figure 7B:
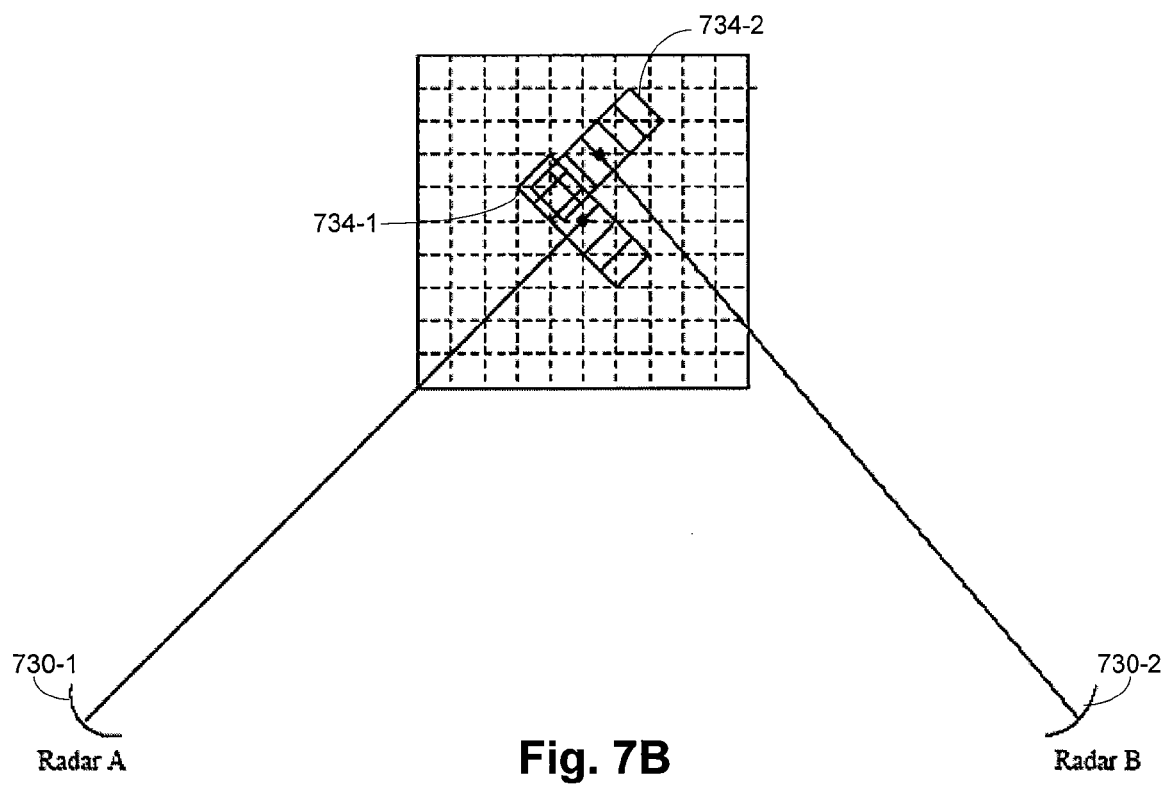
FIG. 7B provides an illustration of pointing-mismatch issues that may arise with networked radar environments.

The pointing mismatch illustrated in FIG. 7B arises when the beam axes for different radars 630 do not intersect at the positions of the respective volumes 734. In such instances, a similar adjustment to the reflectivity at common volume may be expressed as $$Z_h(V_N)=Z_{h,A}(V_N)+\delta Z_{h,A}{}^P(V_N)=Z_{h,B}(V_N)+\delta Z_{h,B}{}^P(V_N)=\ldots \quad (10)$$

with $\delta Z_{h,R}{}^P(V_N)$ denoting a reflectivity adjustment attributable to pointing mismatch variations for radar R at common volume $V_N$.

Figure 8:
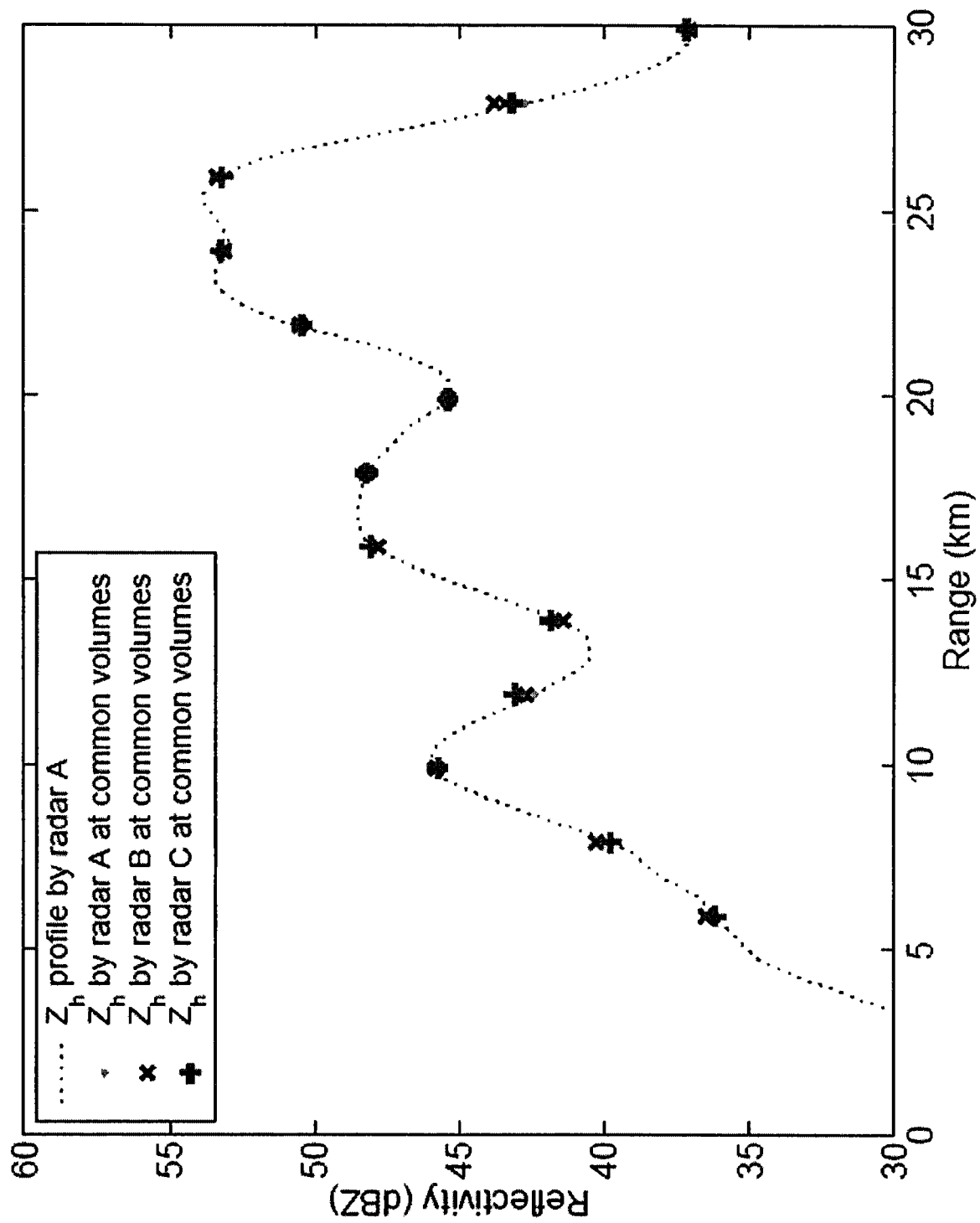
FIG. 8 provides an illustration of the effects of range-resolution and pointing-mismatch issues on reflectivity.

The results shown in FIG. 8 illustrate the effect of these factors on the reflectivity for a particular example. The drawing includes results for a three-radar system at thirteen distinct volumes; a smooth curve has been drawn through the results for one of the radars, identified as radar A, to simplify a comparison of the reflectivities determined for the different radars. It is evident that there are small differences for the different radars attributable to variations in range resolution and pointing mismatch, but that there is generally good consistency among the different radars. These effects are further quantified in the examples described below to confirm that they have minimal impact on the accuracy of results obtained by methods of the invention.

Specific simulations have been performed by the inventors to evaluate the reflectivity and specific attenuation as recovered by the methods of the invention using X-band data. The data were synthesized from high-resolution S-band dual-polarization measurements (reflectivity and differential reflectivity) using relationships between S- and X-band radar variables. These relationships were derived by regression using data obtained by scattering simulations for widely varying drop-size distribution. For evaluation, networks of three radar systems scanning at a low elevation plane were considered.

a. 000204-000607 UTC on Date No. 1

One specific example permits evaluation of range resolution and pointing mismatch issues using a three-radar system operating in the X-band with an antenna beam width of 2°. Results of this example, using data collected on a first date at 000204-000607 UTC, are presented in FIGS. 9A-9O. The intrinsic reflectivity determined by application of the method of FIG. 3A is shown in FIG. 9A, with the corresponding intrinsic specific attenuation shown in FIG. 9B. The locations of the three radars in FIGS. 9A and 9B are shown with "x" designators; the dotted rings correspond to maximum unambiguous ranges for the respective radars. The three radars are denoted as radar A, radar B and radar C.

Figure 9F:
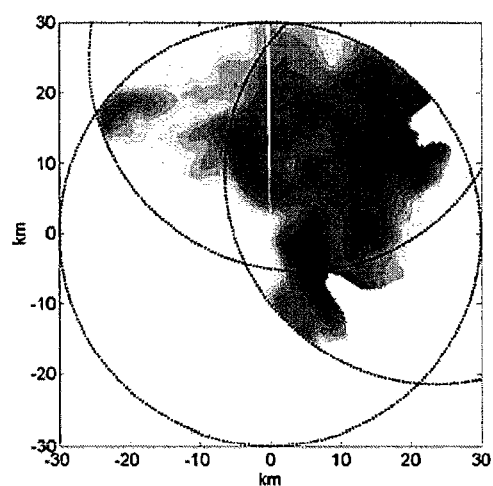
FIGS. 9A-9O are results of applying the method of FIG. 3A in a first example.
Figure 9G:
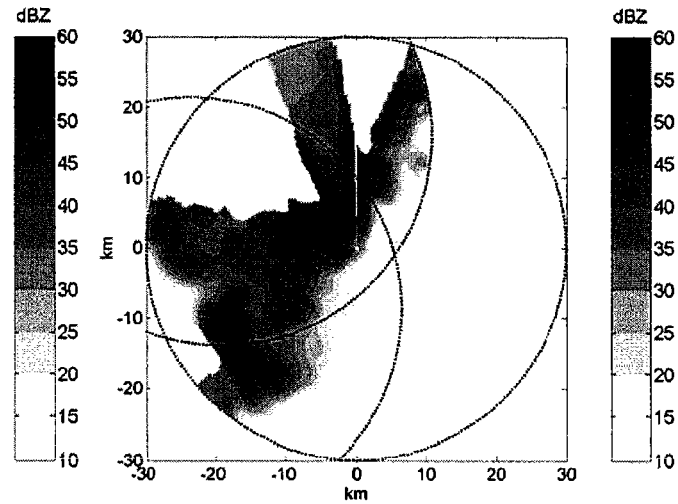
Figure 9H:
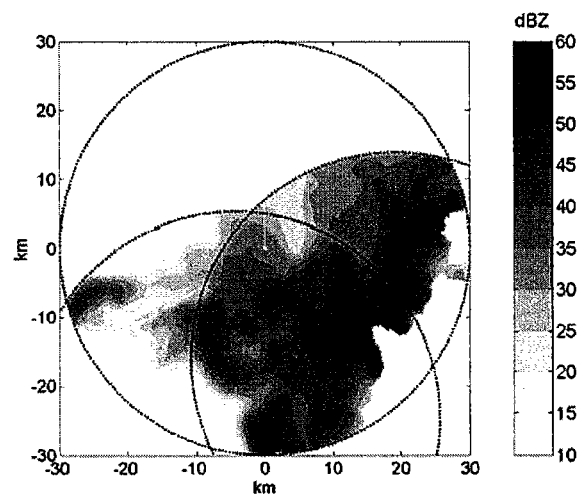
Figure 9I:
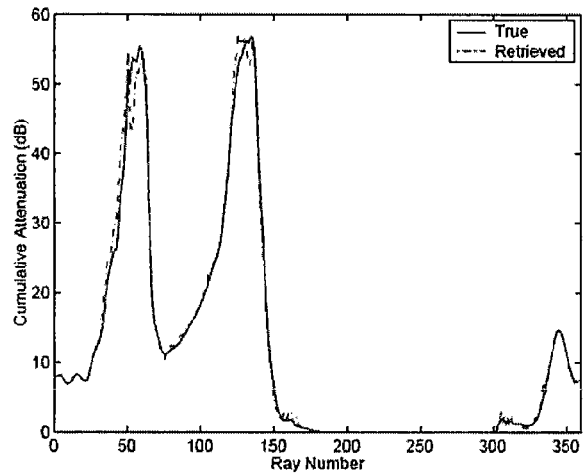
Figure 9J:
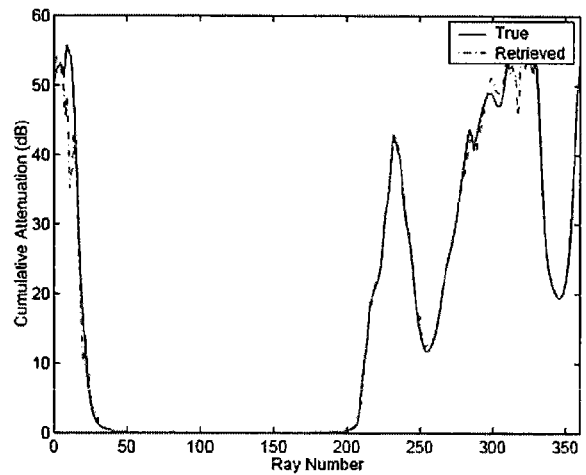
Figure 9K:
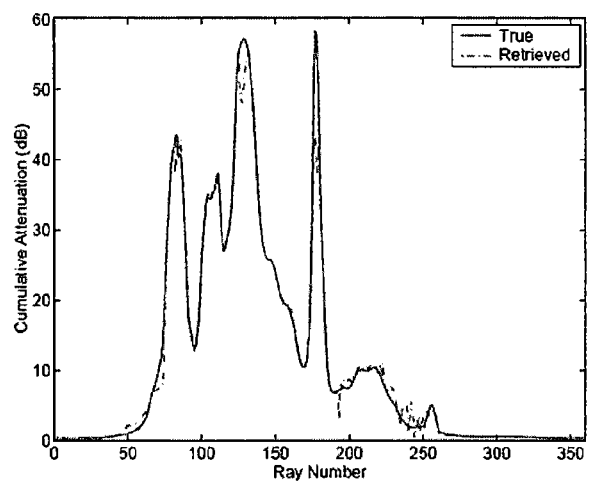

FIGS. 9C-E show attenuated reflectivity for the three radars identified in FIGS. 9A and 9B, with FIG. 9C showing the attenuated reflectivity for radar A, FIG. 9D showing the attenuated reflectivity for radar B, and FIG. 9E showing the attenuated reflectivity for radar C. These results clearly show the impact of attenuation according to radar location and beam path. Using the attenuated reflectivity from each radar and applying Eqs. (5) and (6), the reflectivity for each radar is retrieved as shown in FIGS. 9F-H, with FIG. 9F showing the retrieved reflectivity for radar A, FIG. 9G showing the retrieved reflectivity for radar B, and FIG. 9H showing the retrieved reflectivity for radar C. For comparison of reflectivity retrieval of each radar, intrinsic cumulative attenuation and retrieved cumulative attenuation are shown in FIGS. 9I-K, with FIG. 9I showing results for radar A, FIG. 9J showing results for radar B, and FIG. 9K showing results for radar C.

The retrieved data were interpolated to a grid system in the coplane coordinate system. The retrieved reflectivity and specific attenuation that interpolated with retrieved variables of each radar are shown in FIGS. 9L (retrieved reflectivity) and 9M (retrieved specific attenuation). For comparison, the distribution of the difference between intrinsic reflectivity and retrieved reflectivity is shown in FIG. 9N and the distribution between intrinsic specific attenuation and retrieved specific attenuation is shown in FIG. 9O. The standard deviation of the difference between intrinsic reflectivity and retrieved reflectivity is 0.74 dBZ with negligible bias, and the difference between intrinsic specific attenuation and retrieved specific attenuation is 0.18 dB/km.

The results for this example thus confirm the good accuracy of the retrieval method.

b. 013006-013707 UTC on Date No. 1

Figure 10F:
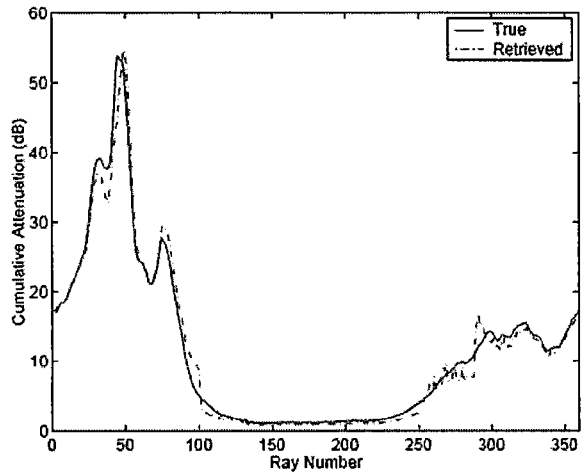
Figure 10G:
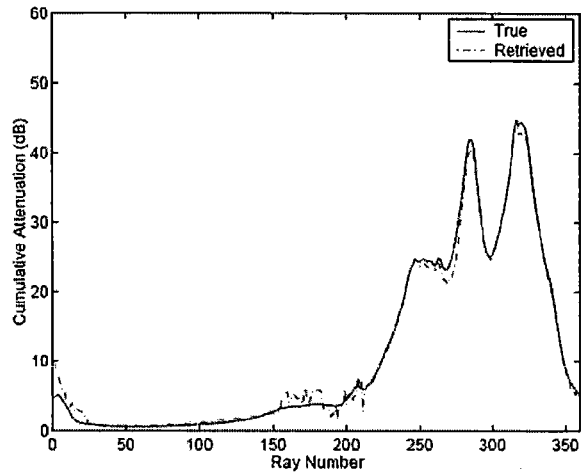
Figure 10H:
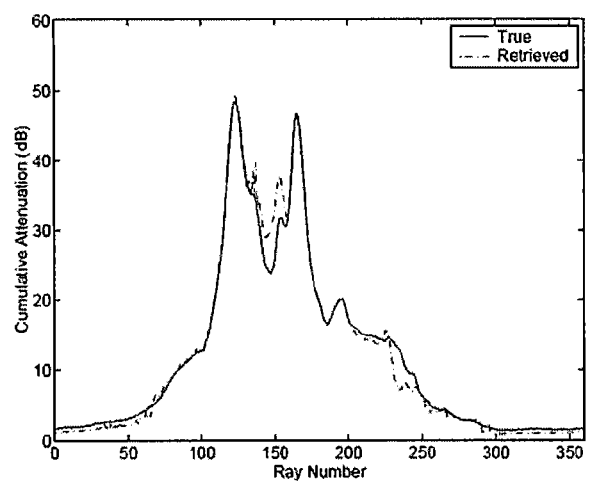

A similar set of results is presented in FIGS. 10A-10L for data collected on the first date at 013006-013707 UTC. FIG. 10A shows the intrinsic reflectivity and FIG. 10B shows the intrinsic attenuation, with "x" designators again being used to identify the locations of radars A, B, and C and dotted rings being used to identify maximum unambiguous range. Attenuated reflectivities are shown for radar A in FIG. 10C, for radar B in FIG. 10D, and for radar C in FIG. 10E. A comparison of reflectivity retrieval for radar A is provided by showing the intrinsic cumulative attenuation and retrieved cumulative attenuation for radar A in FIG. 10F, for radar B in FIG. 10G, and for radar C in FIG. 10H.

Figure 10I:
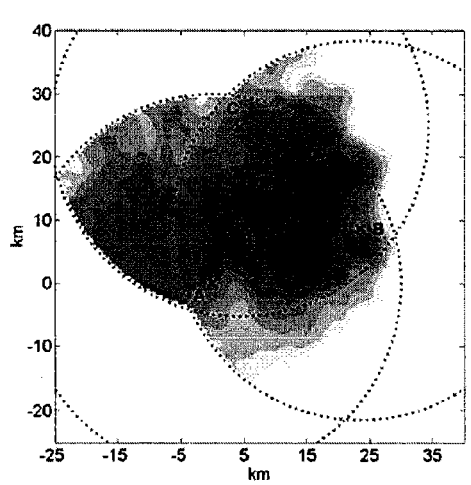
Figure 10J:
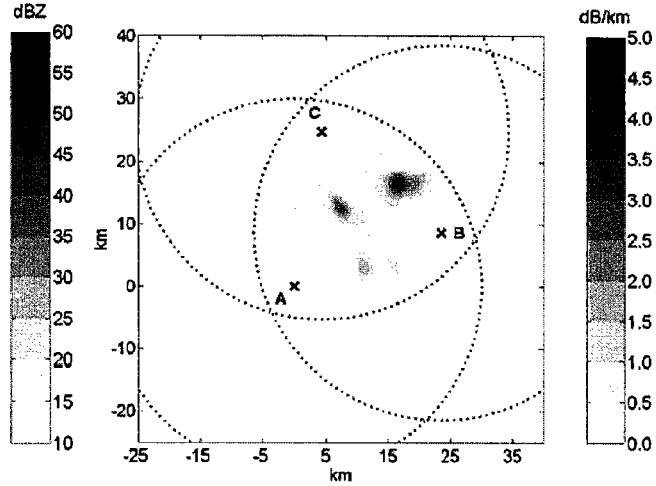
Figure 10K:
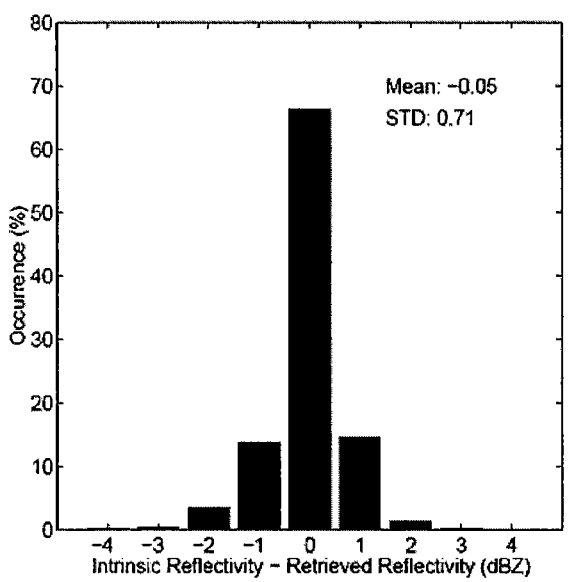
Figure 10L:
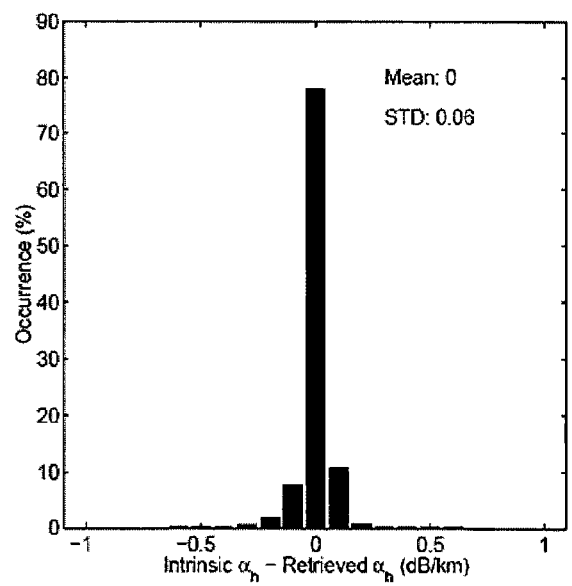

The retrieved reflectivity for the system is shown in FIG. 10I and the retrieved specific attenuation is shown in FIG. 10J. These results were determined by interpolating the retrieved data to a grid system in the coplane coordinate system. For purposes of comparison, the distribution of the difference between intrinsic reflectivity and retrieved reflectivity is shown in FIG. 10K; the standard deviation of that difference is 0.71 dBZ. The distribution of the difference between intrinsic specific attenuation and retrieved specific attenuation is shown in FIG. 10L; the standard deviation of that difference is 0.06 dB/km.

These results thus again confirm the good accuracy of the retrieval method.

c. 201245-201348 UTC on Date No. 2

Figure 11F:
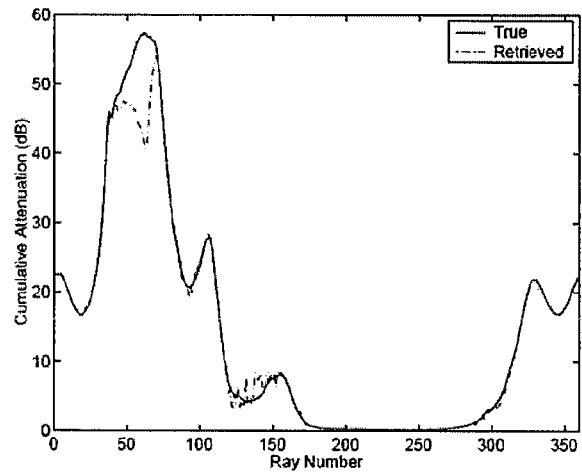
Figure 11G:
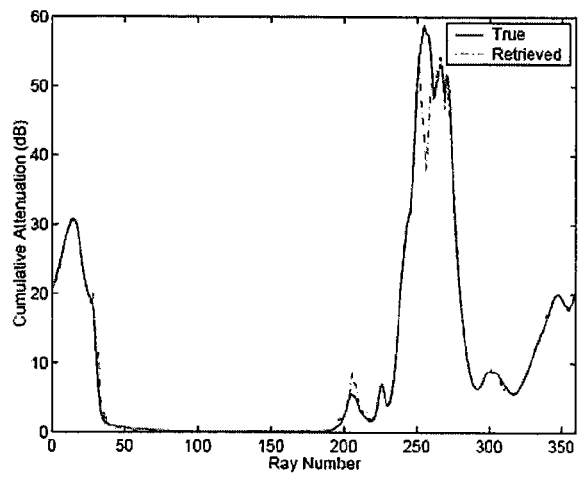
Figure 11H:
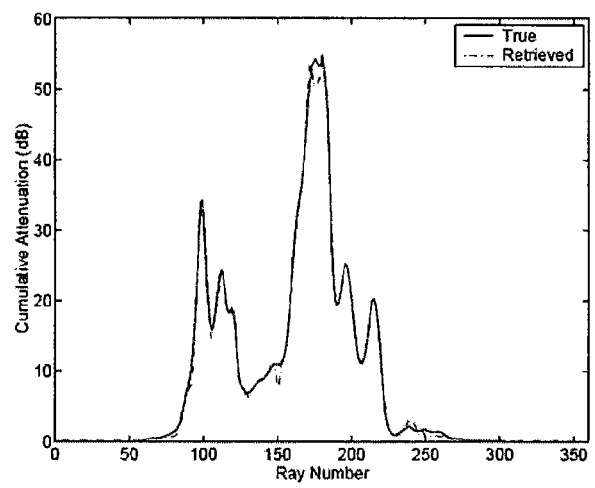

A further set of results is presented in FIGS. 11A-11L for data collected on a second date at 201245-201348 UTC. The various plots correspond to plots with the same letter identifier for the preceding example. FIG. 11A shows the intrinsic reflectivity and FIG. 11B shows the specific attenuation, with attenuated reflectivities for radars A, B, and C being shown respectively in FIGS. 11C, 11D, and 11E. Intrinsic cumulative attenuation and retrieved cumulative attenuation are shown for radars A, B, and C respectively in FIGS. 11F, 11G, and 11H. Retrieved reflectivity for the system is shown in FIG. 11I and retrieved specific attenuation for the system is shown in FIG. 11J after interpolation of retrieved data to a grid system in the coplane coordinate system.

A comparison may be effected by considering FIG. 11K, which shows the distribution of the difference between intrinsic reflectivity and retrieved reflectivity, with the standard deviation of the difference being 0.50 dBZ; and by considering FIG. 11L, which shows the distribution of the difference between intrinsic specific attenuation and retrieved specific attenuation, with the standard deviation of the difference being 0.07 dB/km.

These results thus again confirm the good accuracy of the retrieval method.

d. Calibration

The inventors also investigated the effect that calibration errors may play in results obtained by methods of the invention. The results of such an investigation unexpectedly showed that the method is generally insensitive to calibration errors. This is illustrated by the results in the following table, which provide mean and standard deviations for the difference between true and retrieved specific attenuation with the introduction of signal fluctuations and system bias. The results were obtained for a three-radar system, using a variety of different scenarios to test the performance of the method. The three radars are labeled "A," "B," and "C" in the table, and the left columns show the biases that were introduced in the various scenarios. For example, the second row shows results for a bias of 1 dB in radar A, 0 dB in radar B, and 0 dB in radar C. It is evident from the results that the specific attenuation retrieval is only minimally impacted by system biases.

| System Bias (dB) | | | Specific attenuation (dB/km) | |
|---|---|---|---|---|
| A | B | C | Mean | Standard Deviation |
| 0 | 0 | 0 | −0.03 | 0.21 |
| 1 | 0 | 0 | −0.03 | 0.21 |
| 0 | 1 | 0 | −0.03 | 0.21 |
| 0 | 0 | 1 | −0.03 | 0.22 |
| 1 | 1 | 0 | −0.03 | 0.21 |
| 0 | 1 | 1 | −0.03 | 0.21 |
| 1 | 0 | 1 | −0.03 | 0.21 |
| 1 | 1 | 1 | −0.03 | 0.21 |
| 1 | 1 | −1 | −0.03 | 0.22 |
| 1 | −1 | 1 | −0.03 | 0.22 |
| −1 | 1 | 1 | −0.03 | 0.22 |
| 0 | −1 | −1 | −0.02 | 0.21 |
| −1 | −1 | −1 | −0.02 | 0.21 |

After discovering this insensitivity to calibration errors, the inventors considered potential mechanisms that might give rise to this effect. It is hypothesized that attenuation is of a character that impacts measurement results based on the way in which it changes over distance rather than on an absolute scale. This character manifests itself in applications of the method with the observed insensitivity to calibration errors.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of operating a radar network, the method comprising:
    generating respective radar beams with each of a plurality of radars disposed at different positions within an environment;
    determining a respective measured reflectivity of the environment along a respective path of each of the respective radar beams from the generated respective radar beams, wherein the respective measured reflectivity is attenuated along at least a portion of the respective path of at least one of the respective radar beams; and
    determining an intrinsic reflectivity for different volume elements within the environment from the respective measured reflectivity along the respective path of each of the respective radar beams.

2. The method recited in claim 1 wherein determining the intrinsic reflectivity for different volume elements comprises:
    identifying the different volume elements;
    retrieving an estimate of the intrinsic reflectivity for each of the different volume elements;
    calculating a cost function defined in terms of the estimate of the intrinsic reflectivity of the different volume elements; and
    varying the estimate to find an extremum of the cost function.

3. The method recited in claim 2 wherein the extremum of the cost function is a local minimum of the cost function.

4. The method recited in claim 2 wherein retrieving the estimate of the intrinsic reflectivity of each of the different volume elements comprises:
    setting an initial seed value of the estimate of the intrinsic reflectivity for a selected one of the volume elements; and
    retrieving the estimate of the intrinsic reflectivity for a remainder of the volume elements from the initial seed value and from the measured reflectivity of the environment along the respective path of a selected one of the radar beams.

5. The method recited in claim 4 wherein calculating the cost function comprises:
    retrieving an estimate of a specific attenuation along the respective path of the selected one of the radar beams from the initial seed value and from the measured reflectivity of the environment along the respective path of the selected one of the radar beams; and
    retrieving an estimate of a specific attenuation along the respective paths of the remainder of the radar beams from the seed value and from the retrieved estimate of the intrinsic reflectivity for the remainder of the volume elements.

6. The method recited in claim 5 wherein the cost function is $$\delta k \equiv \frac{1}{N} \sum_{i=1}^{N} \frac{\sum_{radars} |\hat{\alpha}_h(V_i) - \overline{\alpha}_h(V_i)|}{\overline{\alpha}_h(V_i) \big/ \sum_{j=1}^{N} \overline{\alpha}_h(V_j)},$$

where N is the number of different volumes along the respective path of the selected one of the radar beams, $\hat{\alpha}_h(V_i)$ is the retrieved estimate of the specific attenuation along the respective path of a respective one of the radars at volume element $V_i$, and $\overline{\alpha}_h(V_i)$ is a mean of $\hat{\alpha}_h(V_i)$ over the plurality of radars.

7. The method recited in claim 1 wherein the different volume elements are grouped into a plurality of sets of common volume elements, each set of common volume elements comprising different volume elements disposed along the respective paths of the respective radar beams at an approximately common spatial position within the environment.

8. The method recited in claim 7 wherein each of the different volume elements comprised by each set of common volume elements has substantially the same spatial volume.

9. The method recited in claim 1 wherein at least two of the respective radar beams have different frequencies.

10. The method recited in claim 1 wherein at least one of the respective radar beams has an X-band frequency.

11. The method recited in claim 1 further comprising:
moving a physical position of at least one of the plurality of radars; and
repeating the steps of generating respective radar beams, determining the respective measured reflectivity, and determining the intrinsic reflectivity after moving the physical position.

12. A networked-radar evaluation system comprising:
a communications device;
a storage device;
a processor in communication with the communications device and with the storage device; and
a memory coupled with the processor, the memory comprising a computer-readable medium having a computer-readable program embodied therein for directing operation of the processing system to retrieve an intrinsic reflectivity from an environment, the computer-readable program comprising:
instructions for receiving, with the communications device, a respective measured reflectivity of the environment along a respective path of each of a plurality of radar beams generated from respective ones of a plurality of radars disposed at different positions within the environment, wherein the respective measured reflectivity is attenuated along at least a portion of the respective path of at least one of the respective radar beams; and
instructions for determining, with the processor, the intrinsic reflectivity for different volume elements within the environment from the respective measured reflectivity along the respective path of each of the plurality of radar beams.

13. The networked-radar evaluation system recited in claim 12 wherein the instructions for determining the intrinsic reflectivity for different volume elements comprises:
instructions for identifying the different volume elements;
instructions for retrieving an estimate of the intrinsic reflectivity for each of the different volume elements;
instructions for calculating a cost function defined in terms of the estimate of the intrinsic reflectivity of the different volume elements; and
instructions for varying the estimate to find an extremum of the cost function.

14. The networked-radar evaluation system recited in claim 13 wherein the extremum of the cost function is a local minimum of the cost function.

15. The network-radar evaluation system recited in claim 13 wherein the instructions for retrieving the estimate of the intrinsic reflectivity of each of the different volume elements comprises:
instructions for setting an initial seed value of the estimate of the intrinsic reflectivity for a selected one of the volume elements; and
instructions for retrieving the estimate of the intrinsic reflectivity for a remainder of the volume elements from the initial seed value and from the measured reflectivity of the environment along the respective path of a selected one of the radar beams.

16. The networked-radar evaluation system recited in claim 15 wherein the instructions for calculating the cost function comprise:
instructions for retrieving an estimate of a specific attenuation along the respective path of the selected one of the radar beams from the initial seed value and from the measured reflectivity of the environment along the respective path of the selected one of the radar beams; and
instructions for retrieving an estimate of a specific attenuation along the respective paths of the remainder of the radar beams from the seed value and from the retrieved estimate of the intrinsic reflectivity for the remainder of the volume elements.

17. The networked-radar evaluation system recited in claim 16 wherein the cost function is $$\delta k \equiv \frac{1}{N} \sum_{i=1}^{N} \frac{\sum_{\text{radars}} |\hat{\alpha}_h(V_i) - \overline{\alpha}_h(V_i)|}{\overline{\alpha}_h(V_i) / \sum_{j=1}^{N} \overline{\alpha}_h(V_j)},$$

where N is the number of different volumes along the respective path of the selected one of the radar beams, $\hat{\alpha}_h(V_i)$ is the retrieved estimate of the specific attenuation along the respective path of a respective one of the radars at volume element $V_i$, and $\overline{\alpha}_h(V_i)$ is a mean of $\hat{\alpha}_h(V_i)$ over the plurality of radars.

18. The networked-radar evaluation system recited in claim 12 wherein the different volume elements are grouped into a plurality of sets of common volume elements, each set of common volume elements comprising different volume elements disposed along the respective paths of the respective radar beams at an approximately common spatial position within the environment.

19. The networked-radar evaluation system recited in claim 18 wherein each of the different volume elements comprised by each set of common volume elements has substantially the same spatial volume.

20. The networked-radar evaluation system recited in claim 12 wherein at least two of the respective radar beams have different frequencies.

21. The networked-radar evaluation system recited in claim 12 wherein at least one of the respective radar beams has an X-band frequency.

22. A radar network comprising:
a plurality of radars disposed at different positions within an environment; and
a computational unit interfaced with the plurality of radars, the computational unit having instructions to determine an intrinsic reflectivity for different volume elements within the environment from a respective measured reflectivity along a respective path of each of a plurality of respective radar beams, wherein the respective measured reflectivity is attenuated along at least a portion of the respective path of at least one of the respective radar beams.

23. The radar network recited in claim 22 wherein at least two of the respective radar beams have different frequencies.

24. The radar network recited in claim 22 wherein at least one of the respective radar beams has an X-band frequency.

25. The radar network recited in claim 22 wherein the plurality of radars are disposed on cellular-telephone towers.

26. The radar network recited in claim 22 wherein at least one of the radars is in motion relative to another of the radars.

27. The radar network recited in claim 22 wherein at least one of the radars is disposed on a moving vehicle.

28. The radar network recited in claim 22 wherein the computational unit further has instructions to determine a velocity from Doppler information embodied in the respective measured reflectivity along the respective path of each of the plurality of respective radar beams.

29. The radar network recited in claim 22 wherein the instructions to determine the intrinsic reflectivity comprise:

instructions for identifying the different volume elements;
instructions for retrieving an estimate of the intrinsic reflectivity for each of the different volume elements;
instructions for calculating a cost function defined in terms of the estimate of the intrinsic reflectivity of the different volume elements; and
instructions for varying the estimate to find an extremum of the cost function.

30. The radar network recited in claim 29 wherein the instructions for retrieving the estimate of the intrinsic reflectivity of each of the different volume elements comprise:
instructions for setting an initial seed value of the estimate of the intrinsic reflectivity for a selected one of the volume elements; and
instructions for retrieving the estimate of the intrinsic reflectivity for a remainder of the volume elements from the initial seed value and from the measured reflectivity along the respective path of a selected one of the radar beams.

31. The radar network recited in claim 30 wherein the instructions for calculating the cost function comprise:
instructions for retrieving an estimate of a specific attenuation along the respective path of the selected one of the radar beams from the initial seed value and from the measured reflectivity along the respective path of the selected one of the radar beams; and
instructions for retrieving an estimate of a specific attenuation along the respective paths of the remainder of the radar beams from the seed value and from the retrieved estimate of the intrinsic reflectivity for the remainder of the volume elements.

32. The radar network recited in claim 31 wherein the cost function is $$\delta k \equiv \frac{1}{N} \sum_{i=1}^{N} \frac{\sum_{\text{radars}} |\hat{\alpha}_h(V_i) - \overline{\alpha}_h(V_i)|}{\overline{\alpha}_h(V_i) \Big/ \sum_{j=1}^{N} \overline{\alpha}_h(V_j)},$$

where N is the number of different volumes along the respective path of the selected one of the radar beams, $\hat{\alpha}_h(V_i)$ is the retrieved estimate of the specific attenuation along the respective path of a respective one of the radars at volume element $V_i$, and $\overline{\alpha}_h(V_i)$ is a mean of $\hat{\alpha}_h(V_i)$ over the plurality of radars.

* * * * *